United States Patent
Ishizuya et al.

(10) Patent No.: US 7,116,192 B2
(45) Date of Patent: Oct. 3, 2006

(54) MICRO ACTUATOR AND OPTICAL SWITCH USING THE ACTUATOR

(75) Inventors: Tohru Ishizuya, Tokyo (JP); Junji Suzuki, Hachioji (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 10/947,530

(22) Filed: Sep. 22, 2004

(65) Prior Publication Data

US 2005/0100269 A1   May 12, 2005

Related U.S. Application Data

(63) Continuation of application No. PCT/JP03/03687, filed on Mar. 26, 2003.

(30) Foreign Application Priority Data

Mar. 28, 2002 (JP) ............................. 2002-091426
Jul. 29, 2002 (JP) ............................. 2002-220368
Mar. 11, 2003 (JP) ............................. 2003-065051

(51) Int. Cl.
*H01H 51/22* (2006.01)
(52) U.S. Cl. ........................................ 335/78; 200/181
(58) Field of Classification Search .................. 335/78; 200/181
See application file for complete search history.

(56) References Cited

U.S. PATENT DOCUMENTS 5,638,946 A * 6/1997 Zavracky .................... 200/181
6,195,478 B1   2/2001 Fouquet
6,320,145 B1 * 11/2001 Tai et al. ..................... 200/181
6,532,093 B1   3/2003 Sun et al.
6,875,936 B1 * 4/2005 Suzuki et al. ............... 200/181
2002/0027487 A1   3/2002 Suzuki

FOREIGN PATENT DOCUMENTS

JP   2002-023073 A   1/2002
JP   2002-072127 A   3/2002

* cited by examiner

*Primary Examiner*—Kyung S. Lee
*Assistant Examiner*—Bernard Rojas
(74) *Attorney, Agent, or Firm*—Frishauf, Holtz, Goodman & Chick, P.C.

(57) ABSTRACT

The movable part is constructed from a bridge part 13 with a cantilever structure in which the fixed end is fastened via a leg part 12. The bridge part 13 has two bridge constituent parts 14 and 15 that are connected in series between the fixed end and the free end. The bridge constituent part 14 on the side of the fixed end is a plate spring part. The bridge constituent part 15 on the side of the free end is a rigid part that possesses rigidity. The bridge constituent part 14 is bent toward the opposite side from the substrate 11 in a state in which the bridge part 13 receives no force. The mirror 2 is disposed on the free end side of the bridge constituent part 15. As a result, a microactuator can be obtained which can be operated by a small driving force.

11 Claims, 20 Drawing Sheets

MICRO ACTUATOR AND OPTICAL SWITCH USING THE ACTUATOR

This is a continuation of PCT International Application No. PCT/JP03/03687 filed on Mar. 26, 2003, which is hereby incorporated by reference.

TECHNICAL FIELD

The present invention relates to an actuator and an optical switch using this actuator.

BACKGROUND ART

As the development of micro-machining techniques has progressed, microactuators have become increasingly important in various fields. For instance, optical switches that switch light paths used in optical communications, etc., may be cited as one example of a field in which microactuators are used. The optical switch disclosed in Japanese Patent Application Kokai No. 2001-142008 may be cited as one example of such an optical switch.

A microactuator comprises a fixed part and a movable part that is movable with respect to the fixed part; there are also microactuators of a type in which the movable part has a cantilever structure. For instance, an example in which the movable part has a cantilever structure is disclosed in FIG. 8 of Japanese Patent Application Kokai No. 2001-142008.

The optical switch disclosed in FIG. 8 of Japanese Patent Application Kokai No. 2001-142008 will be described below. This optical switch comprises an optical waveguide substrate on which optical waveguides are formed in the form of a matrix, and in which grooves into which mirrors can advance are formed at the intersection points of the matrix, and an actuator substrate on which microactuators and mirrors are formed. The mirrors are driven by the microactuators, and when the mirrors advance into the grooves of the optical waveguide substrate, the light is reflected by the mirrors, while when the mirrors are retracted from the grooves, the light advances directly forward, thus switching the light paths.

Furthermore, in the microactuator used in the optical switch disclosed in FIG. 8 of Japanese Patent Application Kokai No. 2001-142008, the movable part is formed only by a uniformly constructed plate spring part. A mirror is fastened to the tip end of this plate spring part. In a case where no driving force is applied, this plate spring part is bent toward the opposite side from the substrate, and when a driving force is applied, the entire surface of the plate spring part on the side of the substrate contacts the surface on the substrate. When the application of the driving force is stopped, the plate spring part returns to a state in which the plate spring part is bent toward the opposite side from the substrate as a result of the spring force (internal stress) of the plate spring part.

As a result of research conducted by the present inventor, it was ascertained that if the movable part is constructed only from a plate spring part that is uniformly constructed and that is bent toward the opposite side from the substrate in a state in which no force is received (as in the conventional microactuator described above) in cases where the movable part has a cantilever structure, it is difficult to operate the microactuator with a small driving force because of the construction of this movable part.

As one example, a case will be described in which a movable electrode is disposed on the tip end of the plate spring part and a fixed electrode is disposed on the substrate in a microactuator that has a movable part structure such as that of the conventional microactuator described above, and the electrostatic force that is generated between the two electrodes by the application of a voltage across the two electrodes is used as a driving force. In this case, in order to reduce the driving force that is required for operation, the distance between the two electrodes in a state in which no voltage is applied across the two electrodes may be shortened, and the length of the plate spring part may be lengthened so that the distance between the fixed end of the plate spring part and the movable electrode is increased. However, since the movable part is constructed only from a plate spring part that is uniformly constructed and that is bent toward the opposite side from the substrate in a state in which no force is received, it is impossible to accomplish both of these design elements at the same time. Specifically, the length of the plate spring part must be unavoidably shortened in order to shorten the distance between the two electrodes in a state in which no voltage is applied across the two electrodes. In this case, furthermore, the movement stroke of the mirrors cannot be sufficiently ensured. On the other hand, if the length of the plate spring part is increased, the distance between the two electrode parts is inevitably lengthened since the plate spring part is bent toward the opposite side from the substrate in a state in which no voltage is applied across the two electrodes. Accordingly, in a microactuator which has a movable part structure such as that of the conventional microactuator described above, it is difficult to operate the microactuator with a small driving force.

DISCLOSURE OF THE INVENTION

The present invention was devised in order to solve such problem points; the object of the present invention is to provide a microactuator that can be operated by a small driving force, and an optical switch using this microactuator.

The first invention that is used to achieve the object described above is a microactuator comprising a fixed part and a movable part with a cantilever structure whose fixed end is fastened to the fixed part, wherein (a) the movable part has a bridge part between the fixed end and free end of the movable part, (b) this bridge part has a plurality of bridge constituent parts that are connected in series between the fixed end and the free end, and (c) one bridge constituent part and at least one other bridge constituent part among the plurality of bridge constituent parts have different bent or non-bent states with respect to the side of the fixed part and the opposite side from this fixed part in a state in which the movable part receives no force.

Here, the term "bent or non-bent states of the bridge constituent parts with respect to the side of the fixed part and the opposite side from this fixed part" refers collectively to the presence or absence of bending of the bridge constituent parts toward the side of the fixed part or toward the opposite side from this fixed part, and in cases where the bridge constituent parts are bent, to all states relating to the bending of the bridge constituent parts toward the side of the fixed part or toward the opposite side from this fixed part, and to all degrees of bending (curvature values) toward either of these sides. Accordingly, bridge constituent parts that are not bent toward either the side of the fixed part or the opposite side from this fixed part, and bridge constituent parts that are bent toward either the side of the fixed part or the opposite side from this fixed part, have different bent or non-bent states with respect to the side of the fixed part and the opposite side from this fixed part. Furthermore, even if two bridge constituent parts are bent toward the same side, these two bridge constituent parts show different bent or non-bent states with respect to the side of the fixed part and the opposite side from this fixed part if the degree of bending is different. Moreover, if the two bridge constituent parts are bent toward different sides (the side of the fixed part and the opposite side from this fixed part), then these two bridge constituent parts have different bent or non-bent states with respect to the side of the fixed part and the opposite side from this fixed part.

The second invention that is used to achieve the object described above is the first invention, which is characterized in that (a) each of the plurality of bridge constituent parts is constructed from a thin film consisting of one or more layers, (b) the number of layers in at least one of the bridge constituent parts among the plurality of bridge constituent parts is smaller than the number of layers in the other bridge constituent parts, and (c) the number of layers, the materials of the respective layers and the thicknesses of the respective layers are the same between the one or more layers that form all of the one or more bridge constituent parts mentioned above and the one or more layers that form parts of the remaining bridge constituent parts.

The third invention that is used to achieve the object described above is the first invention or second invention, which is characterized in that (a) the bridge constituent part located furthest toward the side of the fixed end among the plurality of bridge constituent parts is a plate spring part, and (b) at least one bridge constituent part other than the bridge constituent part that is located furthest toward the side of the fixed end (among the plurality of bridge constituent parts) is a rigid part that possesses substantial rigidity against at least flexing toward the side of the fixed part and flexing toward the opposite side from this fixed part.

The fourth invention that is used to achieve the object described above is the third invention, which is characterized in that (a) the bridge constituent part that is located furthest toward the side of the fixed end is bent toward the opposite side from the fixed part in a state in which the movable part receives no force, and (b) the rigid part is not substantially bent toward either the side of the fixed part or the opposite side from this fixed part.

The fifth invention that is used to achieve the object described above is the first invention or second invention, which is characterized in that (a) the bridge constituent part that is located furthest toward the fixed end (among the plurality of bridge constituent parts) is a plate spring part, and (b) at least one of the bridge constituent parts other than the bridge constituent part that is located furthest toward the fixed end (among the plurality of bridge constituent parts) is a plate spring part.

The sixth invention that is used to achieve the object described above is the fifth invention, which is characterized in that (a) the bridge constituent part that is located furthest toward the fixed end is bent toward the opposite side from the fixed part in a state in which the movable part receives no force, and (b) the one or more bridge constituent parts mentioned above other than the bridge constituent part that is located furthest toward the fixed end are bent toward the side of the fixed part in a state in which the movable part receives no force.

The seventh invention that is used to achieve the object described above is the fifth invention or sixth invention, which is characterized in that at least one other bridge constituent part (other than the bridge constituent part that is located furthest toward the fixed end) among the plurality of bridge constituent parts is a rigid part that possesses substantial rigidity against at least flexing toward the side of the fixed part and flexing toward the opposite side from this fixed part.

The eighth invention that is used to achieve the object described above is the seventh invention, which is characterized in that the rigid part is not substantially bent toward either the side of the fixed part or the opposite side from this fixed part.

The ninth invention that is used to achieve the object described above is the third, fourth, seventh and eighth inventions, further characterized in that the rigid part has a planar part and a reinforcing part that rises or drops from this planar part.

The tenth invention that is used to achieve the object described above is a microactuator comprising a fixed part and a movable part with a cantilever structure whose fixed end is fastened to the fixed part, which is characterized in that (a) the movable part has a bridge part between the fixed end and free end of the movable part, (b) the bridge part has a plurality of bridge constituent parts that are connected in series between the fixed end and the free end, (c) one bridge constituent part and at least one other bridge constituent part among the plurality of bridge constituent parts have different bent or non-bent states with respect to the side of the fixed part and the opposite side from this fixed part in a state in which the movable part receives no force, (d) the bridge constituent part that is located furthest toward the fixed end among the plurality of bridge constituent parts is a plate spring part, (e) at least one bridge constituent part other than the plate spring part among the plurality of bridge constituent parts is a rigid part that possesses substantial rigidity against at least flexing toward the side of the fixed part and flexing toward the opposite side from this fixed part, and (f) the rigid part has a planar part and a reinforcing part that rises or drops from this planar part.

The eleventh invention that is used to achieve the object described above is any of the first through tenth inventions, which is characterized in that the fixed end of the movable part is fastened to the fixed part via a leg part having a rising part that rises from the fixed part.

The twelfth invention that is used to achieve the object described above is any of the first through eleventh inventions, which is characterized in that the movable part is constructed from a thin film.

The thirteenth invention that is used to achieve the object described above is any of the first through twelfth inventions, wherein the fixed part has a first electrode part, and the movable part has a second electrode part which can generate an electrostatic force between itself and the first electrode part as a result of the application of a voltage across the first electrode part and second electrode part.

The fourteenth invention that is used to achieve the object described above is any of the first through thirteenth inventions, which is characterized in that the movable part has a current pathway that generates a Lorentz force as a result of being placed in a magnetic field and powered.

The fifteenth invention that is used to achieve the object described above is an optical switch comprising the microactuator of any of the first through fourteenth inventions and a mirror that is disposed on the movable part.

BEST MODE FOR CARRYING OUT THE INVENTION

Microactuators constituting working configurations of the present invention and optical switches using these microactuators will be described below with reference to the figures.

(First Working Configuration)

Figure 1:
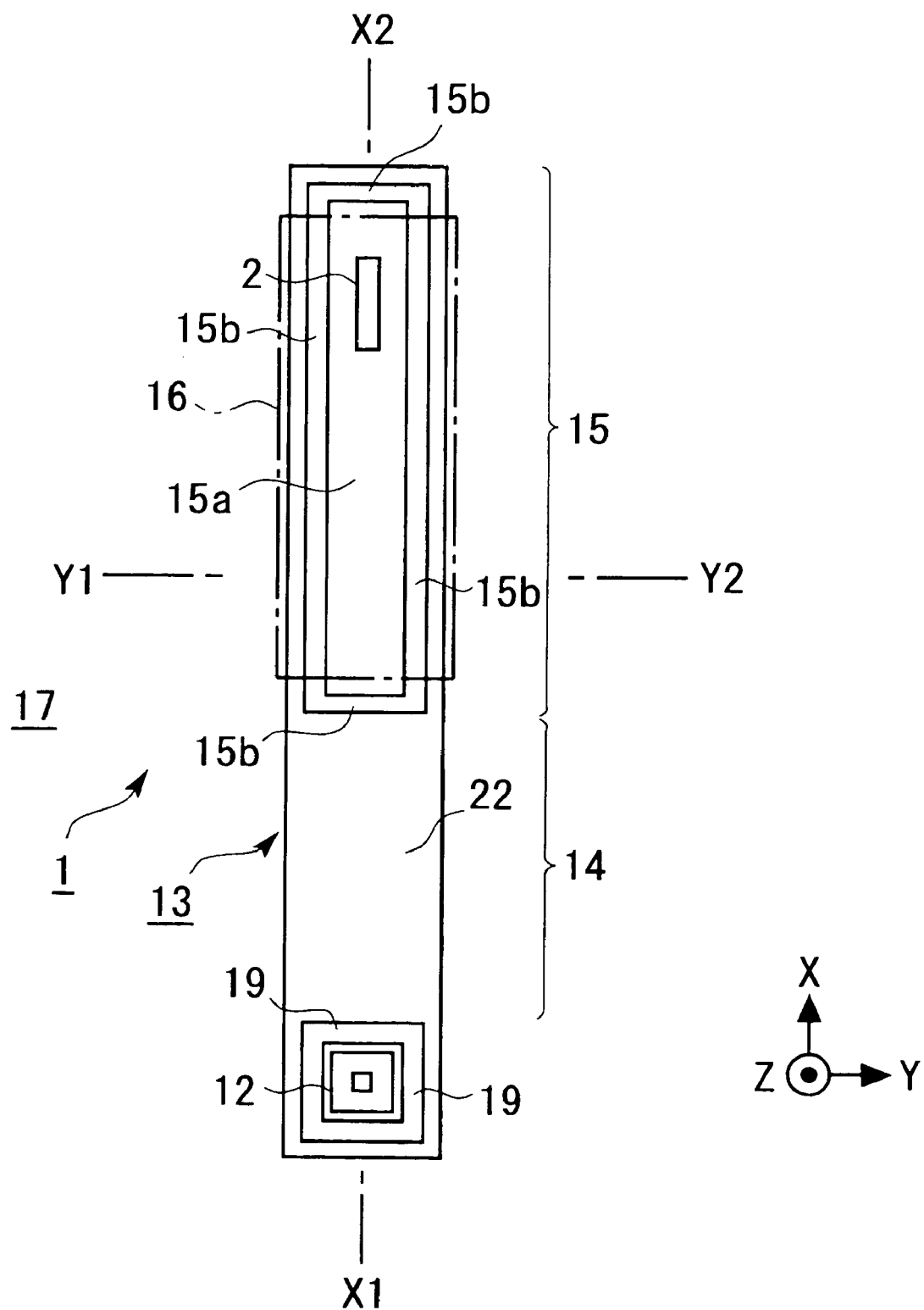
FIG. 1 is a schematic plan view which shows in model form a microactuator constituting a first working configuration of the present invention and a mirror that is driven by this microactuator.
Figure 2:
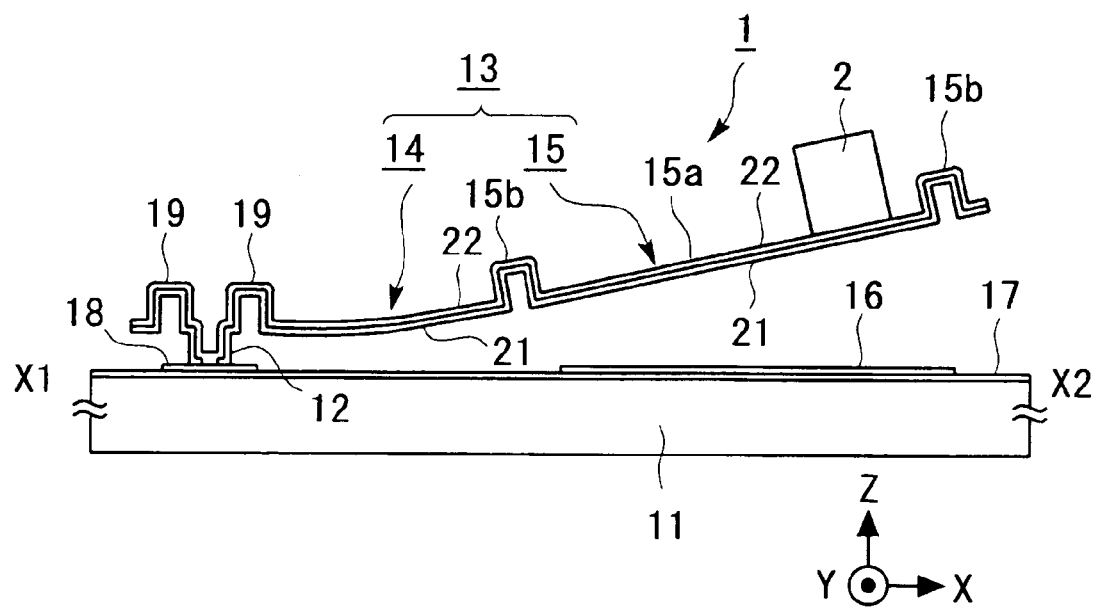
FIG. 2 is a schematic sectional view along line X1-X2 in FIG. 1.
Figure 3:
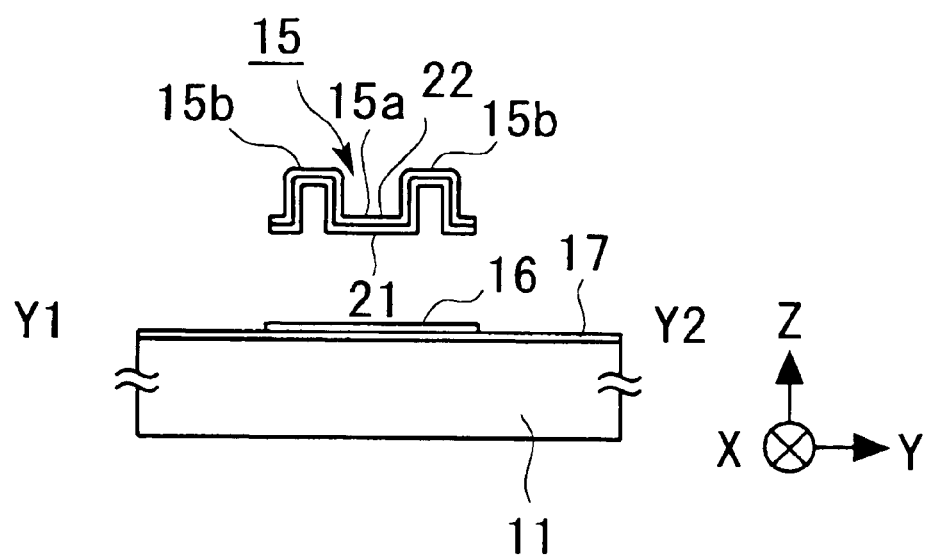
FIG. 3 is a schematic sectional view along line Y1-Y2 in FIG. 1.

FIG. 1 is a schematic plan view which shows in model form a microactuator 1 constituting a first working configuration of the present invention and a mirror 2 that is driven by this microactuator. In FIG. 1, a fixed electrode 16 that is formed on a substrate 11 is indicated by an imaginary line (one-dot chain line). FIG. 2 is a schematic sectional view along line X1-X2 in FIG. 1. FIG. 3 is a schematic sectional view along line Y1-Y2 in FIG. 1. For convenience of description, mutually perpendicular X, Y and Z axes are defined as shown in FIGS. 1 through 3. Furthermore, within the X axis, the direction indicated by the arrow is called the +X direction, and the opposite direction is called the −X direction. The same is true of the directions of the Y and Z axes. The XY plane is parallel to the plane of the substrate 11. These points are the same in the respective figures that are subsequently described. Furthermore, FIGS. 2 and 3 show a state in which no driving signal is supplied (i.e., a state in which the movable part does not receive any force).

The microactuator 1 of the present working configuration comprises a substrate 11 such as a silicon substrate or glass substrate, a leg part 12, a single band-form bridge part 13 which extends in the direction of the X axis in a plan view seen from the direction of the Z axis, and a fixed electrode 16.

The fixed end (end part in the −X direction) of the bridge part 13 is mechanically connected to the substrate 11 via the leg part 12 which has a rising part that rises from the substrate 11 via a wiring pattern 18 (omitted from FIG. 1) consisting of an Al film formed on top of an insulating film 17 such as a silicon oxide film on the surface of the substrate 11. The end part of the bridge part 13 in the +X direction is the free end. Accordingly, in the present working configuration, the bridge part 13 is a cantilever, and this bridge part 13 constitutes a movable part that has a cantilever structure. Furthermore, in the present working configuration, the substrate 11, insulating film 17 and fixed electrode 16 constitute the fixed part described above.

In the present working configuration, a mirror 2 consisting of Au, Ni or some other metal is installed as a driven body on the upper part of the bridge part 13 on the side of the free end (i.e., the upper part of the bridge constituent part 15 described later).

The bridge part 13 has two bridge constituent parts 14 and 15 that are mechanically connected in series in the direction of the X axis between the fixed end and the free end. The bridge constituent parts 14 and 15 are both constructed in a band-form plate shape that extends in the direction of the X axis in a plan view seen from the direction of the Z axis. The bridge constituent part 14 on the side of the fixed end (−X side) constitutes a plate spring part that can flex in the direction of the Z axis, while the bridge constituent part 15 on the side of the free end (+X side) constitutes a rigid part that possesses substantial rigidity against flexing in the direction of the Z axis (toward the substrate 11 and toward the opposite side) and flexing in other directions.

The bridge constituent part 14 is constructed from a two-layer thin film in which a lower-side SiN film 21 and an upper-side Al film 22 are laminated so as to act as a plate spring part. The bridge constituent part 15 is constructed from a two-layer thin film in which a lower-side SiN film 21 and an upper-side Al film 22 that extend "as is" as a continuation of the bridge constituent part 14 are laminated. However, unlike the bridge constituent part 14, the bridge constituent part 15 also has, in addition to a planar part 15a that has a rectangular shape in a plan view seen from the direction of the Z axis, a protruding strip part 15b which is formed in the shape of a square (in a plan view seen from the direction of the Z axis) so as to surround the planar part 15a in the vicinity of the outer periphery of this planar part 15a, and which protrudes in the +Z direction from the planar part 15a. The protruding strip part 15b has a rising part that rises from the planar part 15a; this rising part constitutes a reinforcing part that reinforces the planar part 15a, and imparts the rigidity described above to the bridge constituent part 15.

For example, a similar reinforcing effect could also be obtained by eliminating the rising part on the inner peripheral side of the protruding strip part 15b, and leaving only the rising part on the outer peripheral side of the protruding strip part 15b, so that the height of the planar part 15a is made the same as that of the upper surface of the protruding strip part 15b in the present working configuration. Compared to such a case, however, the present working configuration shows a shorter distance between the fixed electrode 16 and the Al film 22 of the bridge constituent part 15 (that is also used as a movable electrode) in a state in which the bridge part 13 receives no force, so that the driving voltage of the electrostatic force can be reduced. Accordingly, the present working configuration is more desirable. In the present working configuration, as was described above, the protruding strip part 15b is formed in a square shape. However, it would also be possible to form (for example) only the portions that extend in the direction of the X axis in a plan view seen on the +Y side and −Y side; it is not necessary to form the portions that extend in the direction of the Y axis on the +X side and −X side. Even if the protruding strip part 15b is formed in this manner, rigidity against flexing in the direction of the Z axis can be imparted to the bridge constituent part 15.

Furthermore, the material and the number of layers of the bridge constituent parts 14 and 15 are not limited to the example described above; for example, some other insulating film may be used instead of the SiN film 21, and some other conductive film may be used instead of the Al film 22.

Furthermore, as is shown in FIG. 2, in a state in which no driving signal is supplied, the bridge constituent part 14 is bent upward (in the +Z direction toward the opposite side from the substrate 11) by the stress of the films 21 and 22. On the other hand, the bridge constituent part 15 shows no substantial bending in the direction of the Z axis regardless of the presence or absence of a driving signal; as a result of having the rigidity described above, this bridge constituent part 15 constantly maintains a flat-plate-form state without being bent by the stress of the films 21 or 22. Thus, in a state in which the bridge part 13 receives no force, the bridge constituent part 14 and bridge constituent part 15 have different bent or non-bent states.

In the present working configuration, the leg part 12 is constructed by continuously extending the SiN film 21 and Al film 22 that constitute the bridge constituent part 14 "as is." The Al film 22 is electrically connected to a wiring pattern 18 via an opening part formed in the SiN film 21 in the leg part 12. Furthermore, in order to reinforce the strength of the leg part 12, a protruding strip part 19 is formed in a square shape (in a plan view seen from the Z direction) on the upper part of the leg part 12.

In the present working configuration, the microactuator is constructed so that an electrostatic force is caused to act as the driving force. More concretely, in the present working configuration, the Al film 22 in the bridge constituent part 15 is also used as a movable electrode, and a fixed electrode 16 consisting of an Al film is formed in the region on the insulating film 17 formed on the substrate 11 that faces the bridge constituent part 15. The SiN film 21 in the bridge constituent part 15 also functions as an insulating layer that is used to prevent electrical contact between the Al film 22 and the fixed electrode 16. Furthermore, although this is not shown in the figures, the Al film that constitutes the fixed electrode 16 also extends as a wiring pattern, and is utilized together with the wiring pattern 18, so that a voltage can be applied as a driving signal across the fixed electrode 16 and the Al film 22 in the bridge constituent part 15 that is also used as a movable electrode.

When this voltage (driving signal) is applied, an electrostatic force (driving force) acts between the fixed electrode 16 and the Al film 22 used as a movable electrode in the bridge constituent part 15, so that the bridge constituent part 15 is drawn toward the substrate 11 against the spring force (internal stress) of the bridge constituent part 14, and the bridge constituent part 14 is correspondingly deformed. Furthermore, the bridge constituent part 15 stops in a position in which this part contacts the substrate 11; as a result, a state is produced in which the mirror 2 has moved into a position that is in close proximity to the substrate 11. On the other hand, when this voltage is not applied, no electrostatic force (driving force) acts between the fixed electrode 16 and the Al film 22 used as a movable electrode in the bridge constituent part 15, so that the spring force (internal stress) of the bridge constituent part 14 causes the bridge constituent part 15 to return to the state shown in FIG. 2, and the mirror 2 returns to the original upper position that is separated from the substrate 11. A driving circuit that produces this driving signal in accordance with a control signal from the outside may also be mounted on the substrate 11; this point is the same with respect to the respective working configurations that will be described later.

Thus, in the present working configuration, driving is accomplished by means of an electrostatic force that is generated by a driving signal. Of course, in the present invention, the system may also be constructed so that driving is accomplished by some other driving force such as a magnetic force or Lorentz force, or by means of a driving force consisting of an arbitrary combination of two or more different types of driving forces. Furthermore, for example, a driving system may also be employed which utilizes deformation caused by the thermal expansion of at least two mutually superimposed layers of different substances that have different thermal expansion coefficients. In this case, for example, the heat used for the deformation described above can be applied by the absorption of visible light or infrared light, or by the application of an electric current to an electrical resistance part, etc., and the quantity of irradiating light or the amount of electric current applied can be used as the driving signal.

Furthermore, in the present working configuration, the fixed electrode 16 on the substrate 11 is disposed only in the region that faces the bridge constituent part 15 on the side of the free end; however, it would also be possible to extend the fixed electrode 16 to a position facing the bridge constituent part 14 on the side of the fixed end. In this case, not only the Al film 22 in the bridge constituent part 15 but also the Al film 22 in the bridge constituent part 14 acts as a movable electrode.

Figure 4:
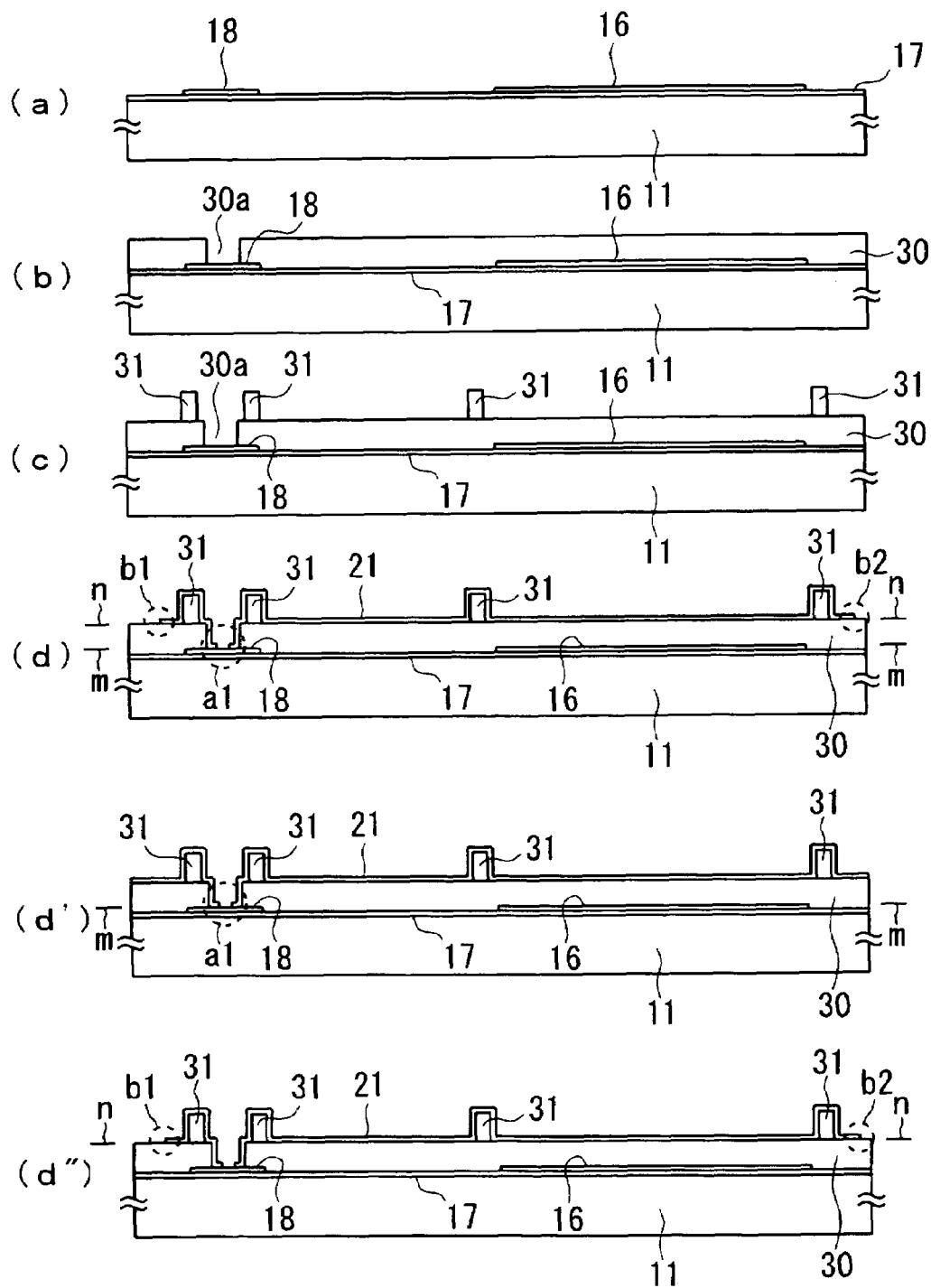
FIG. 4 is a schematic sectional view which respectively shows in model form individual steps of the method for manufacturing the microactuator shown in FIGS. 1 through 3.
Figure 5:
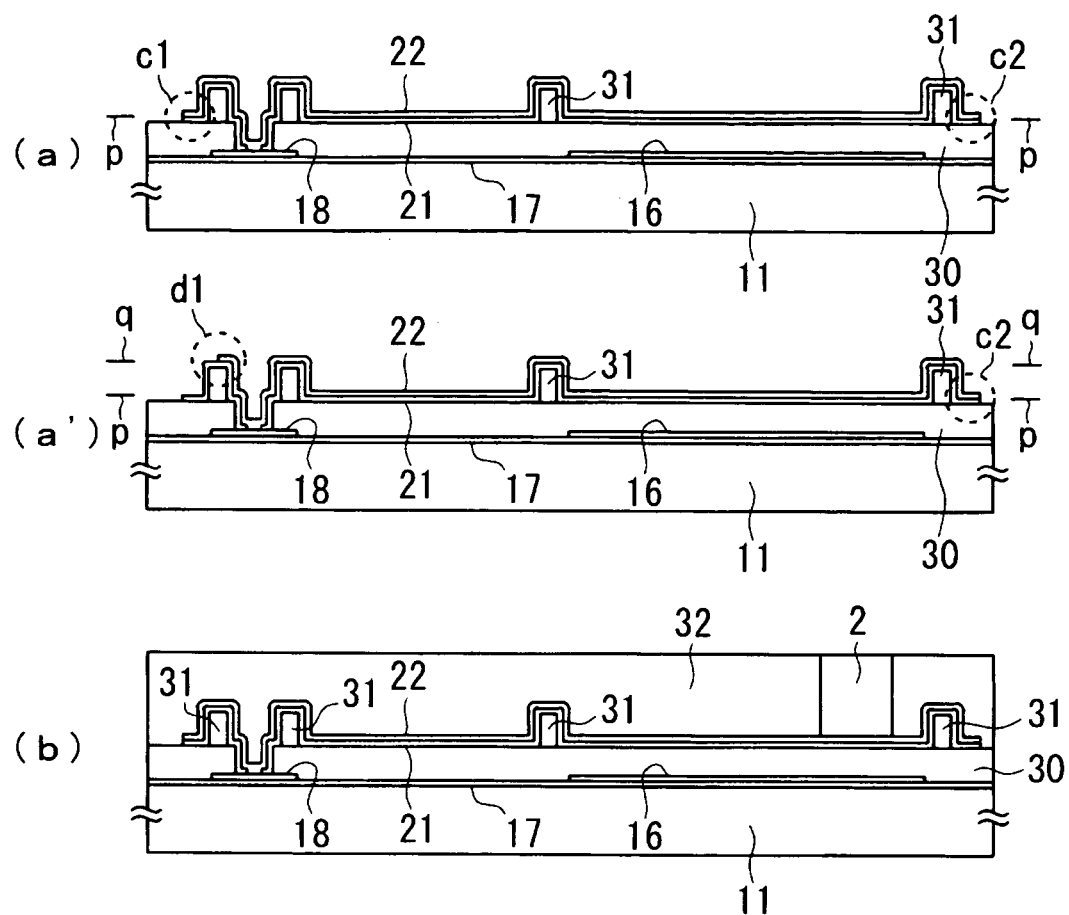
FIG. 5 is a schematic sectional view which respectively shows in model form other individual steps of the method for manufacturing the microactuator shown in FIGS. 1 through 3.

Next, one example of the method for manufacturing the microactuator 1 of the present working configuration will be described with reference to FIGS. 4 and 5. FIGS. 4 and 5 are schematic sectional views which respectively show in model form individual steps of this manufacturing method; these figures correspond to FIG. 2.

First, a silicon oxide film 17 is formed by thermal oxidation on the upper surface of the silicon substrate 11, and an Al film is deposited on top of this silicon oxide film 17 by a vacuum deposition or sputtering method, etc. Then, this Al film is patterned into the shape of the fixed electrode 16, wiring pattern 18 and other wiring patterns by a photolithographic etching method (FIG. 4(*a*)). Next, a resist 30 that constitutes a sacrificial layer is applied as a coating to the surface of the substrate in this state, and an opening 30*a* corresponding to the contact part of the leg part 12 is formed in this resist 30 by a photolithographic etching method (FIG. 4(*b*)).

Next, a resist 31 constituting a sacrificial layer is applied as a coating to the entire surface of the substrate in the state shown in FIG. 4(*b*), and portions other than the portions corresponding to the protruding strip parts 15*b* and 19 in the resist 31 are removed by a photolithographic etching method, so that only these portions corresponding to the protruding strip parts 15*b* and 19 are allowed to remain in island form (FIG. 4(*c*)).

Subsequently, after an SiN film 21 that is to form the leg part 12 and bridge part 13 (bridge constituent parts 14 and 15) is formed by a plasma CVD method or the like, patterning is performed by a photolithographic etching method, so that the shapes of these parts are formed (FIG. 4(*d*)). In this case, an opening is formed in the contact part in the leg part 12.

Furthermore, in FIG. 4(*d*), a total of three locations in the SiN film 21, i.e., location a1 on the plane m, and locations b1 and b2 on the plane n, are photo-etched. In this case, the plane m and plane n differ in height by an amount equal to the film thickness of the resist 30 (e.g., approximately 2 μm); consequently, it is difficult to form both resist patterns with good precision at the time of photolithography. Accordingly, a procedure may be used in which only location a1 on the plane m is first photo-etched as shown in FIG. 4(*d'*) following the step shown in FIG. 4(*c*), and locations b1 and b2 on the plane n are then photo-etched as shown in FIG. 4(*d"*). If the photo-etching process is thus performed with this process divided into separate steps for planes of equal height, the pattern precision can be improved. In this case, furthermore, the same effect can be obtained even if only the photolithographic process is divided, and the etching processes are performed simultaneously.

Next, after the Al film 22 that is to form the leg part 12 and bridge part 13 (bridge constituent parts 14 and 15) is deposited by a vacuum deposition or sputtering method, etc., this film 22 is patterned by a photolithographic etching method so that the shapes of these parts are formed (FIG. 5(*a*)).

Furthermore, in FIG. 5(*a*), a total of two locations in the Al film 22, i.e., locations c1 and c2 on the plane p, are photo-etched. In this case, it is advisable to perform this process so that the end portion of the Al film 22 on the side of location c1 does not reach location d1 as shown in FIG. 5(*a'*). In FIG. 5(*a'*), location d1 is located on the plane q, and location c2 is located on the plane p. In this case, the plane p and plane q differ in height by an amount equal to the film thickness of the resist 31 (e.g., approximately 2 μm); consequently, it is difficult to form both resist patterns with good precision at the time of photolithography. Accordingly, as is shown in FIG. 5(*a*), it is desirable to design the photo-mask so that pattern end portions are formed in locations at the same height in a single photolithographic step.

Next, a resist 32 that constitutes a sacrificial layer is thickly applied as a coating to the entire surface of the substrate in the state shown in FIG. 5(*a*), and the resist 32 is exposed and developed so that a region in which the mirror 2 is grown is formed in the resist 32, after which Au, Ni or some other metal that is to form the mirror 2 is grown by electrolytic plating (FIG. 5(*b*)). Finally, the resists 30 through 32 are removed by a plasma ashing method, etc. As a result, the microactuator 1 of the present working configuration is completed.

Furthermore, as was described above, the formation of the film 21 and film 22 is performed under conditions which are such that the bridge constituent part 14 is caused to bend upward by the stress generated during film formation when the resists 30 through 32 are removed.

The present working configuration differs from the prior art described above in that the bridge part 13 is not constructed only from a single uniform plate spring part; instead, the bridge part 13 is constructed from a bridge constituent part 14 constituting a plate spring part on the side of the fixed end, and a bridge constituent part 15 constituting a rigid part that always has a flat plate form on the side of the free end. Accordingly, the length from the fixed end to the free end of the bridge part 13 can be lengthened, and the distance between the free end of the bridge part 13 and the substrate 11 can be shortened in a state in which the bridge part 13 receives no force (as shown in FIG. 2). Consequently, the position of the movable electrode on the side of the free end (i.e., the Al film on the bridge constituent part 15 in the present working configuration) can be set as a position that is far from the fixed end of the bridge part 13, and that is relatively close to the fixed electrode in the state shown in FIG. 2 in which no driving signal is supplied. Accordingly, in the present working configuration, the system can be operated with a small driving force, so that the microactuator 1 can be operated at a low power.

Thus, in the present working configuration, since the bridge constituent part 14 and bridge constituent part 15 have different bent or non-bent states in a state in which the bridge part 13 receives no force, the distance of the free-end portion of the bridge part 13 from the substrate 11 in a state in which the bridge part 13 receives no force can be freely set at a desired distance while increasing the length of the bridge part 13. As a result, the microactuator 1 can be operated with a small driving force.

(Second Working Configuration)

Figure 6:
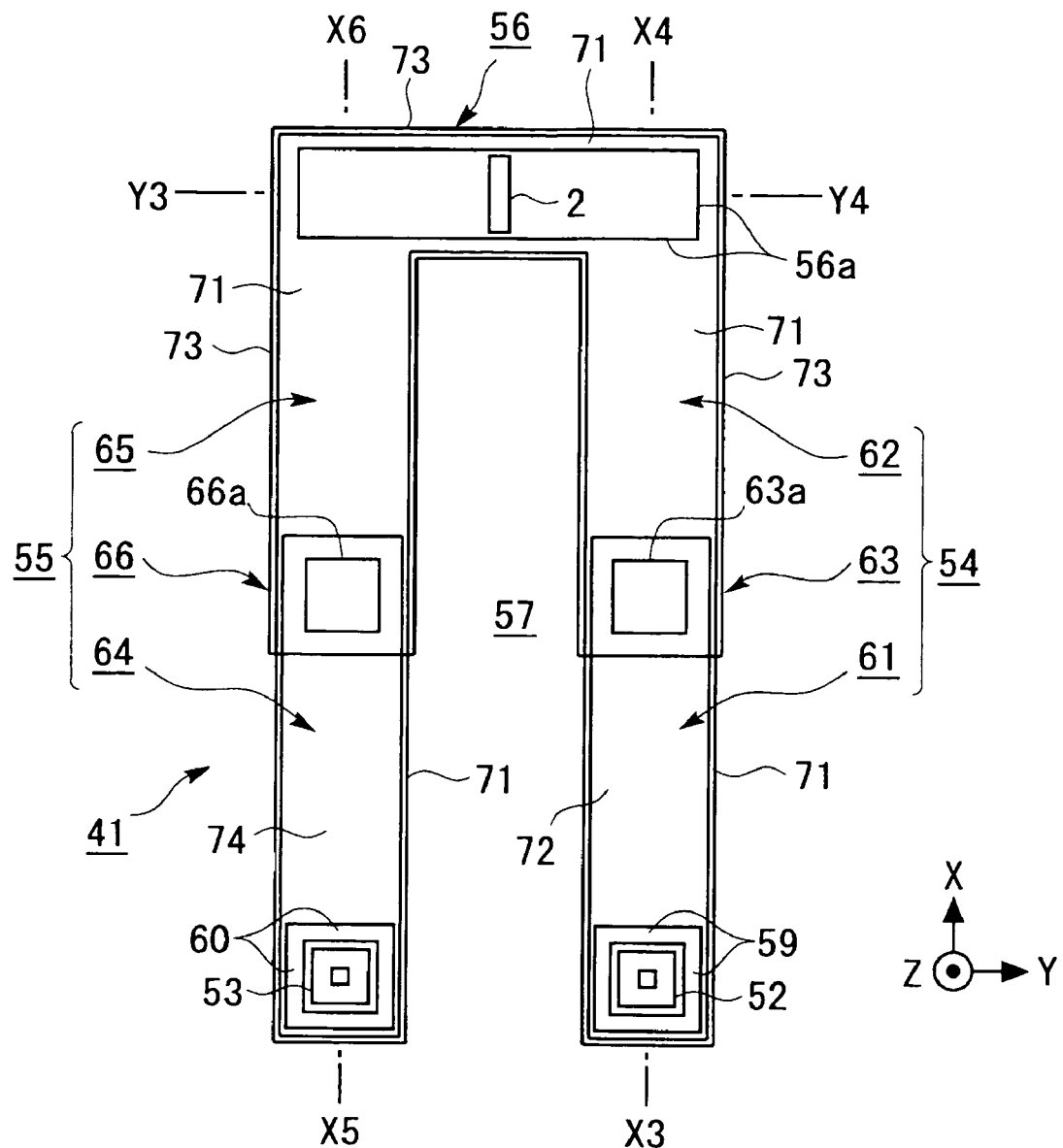
FIG. 6 is a schematic plan view which shows in model form a microactuator constituting a second working configuration of the present invention and a mirror that is driven by this microactuator.
Figure 7:
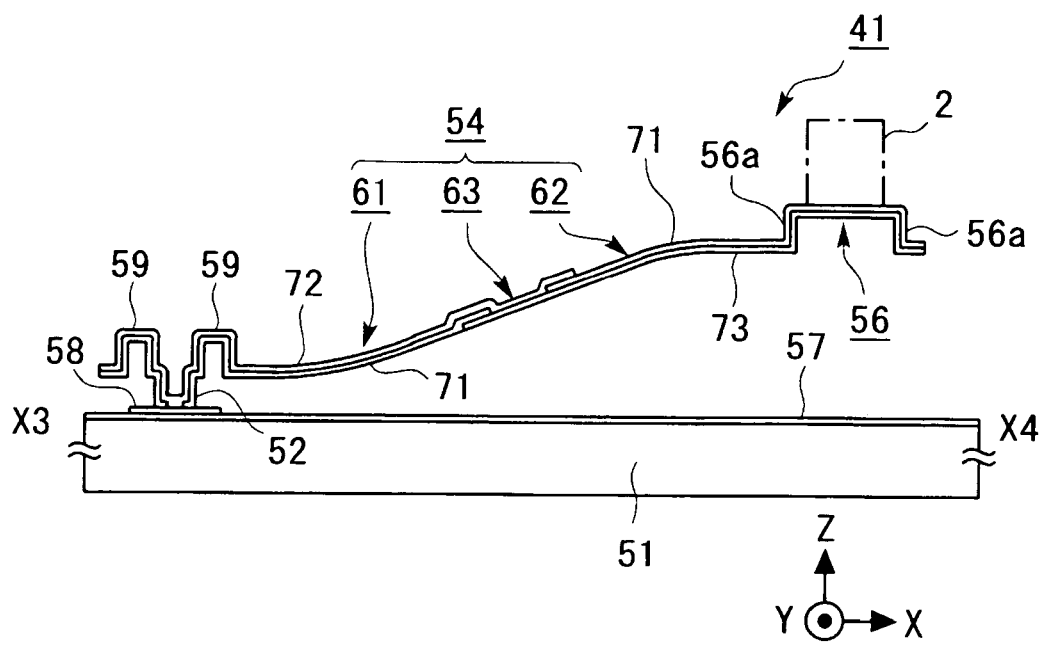
FIG. 7 is a schematic sectional view along line X3-X4 in FIG. 6.
Figure 8:
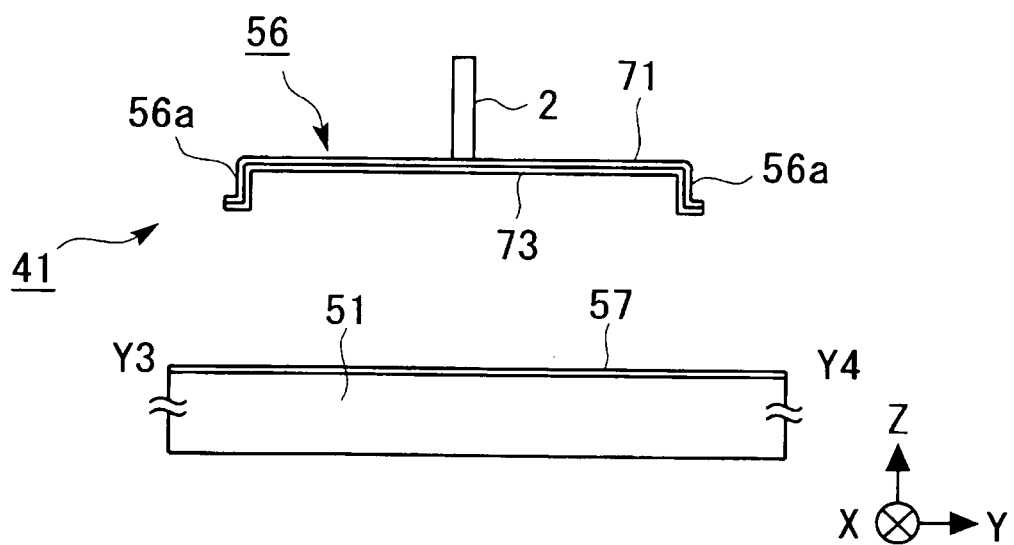
FIG. 8 is a schematic sectional view along line Y3-Y4 in FIG. 6.

FIG. 6 is a schematic plan view which shows in model form a microactuator 41 that constitutes a second working configuration of the present invention and a mirror 2 that is driven by this microactuator. In FIG. 6, lines that should naturally be broken lines (hidden lines) are also shown as solid lines. FIG. 7 is a schematic sectional view along line X3-X4 in FIG. 6. Although this is not shown in the figures, a schematic sectional view along line X5-X6 in FIG. 6 is the same as FIG. 7. FIG. 8 is a schematic sectional view along line Y3-Y4 in FIG. 6. Furthermore, FIGS. 7 and 8 indicate a state in which no driving signal is supplied (i.e., a state in which the movable part does not receive any force).

The microactuator 41 of the present working configuration comprises a substrate 51 such as a silicon substrate or glass substrate, leg parts 52 and 53, two band-plate-form bridge parts 54 and 55 that extend parallel to each other in the direction of the X axis in a plan view seen from the direction of the Z axis, and a connecting part 56 having a rectangular shape (as seen in a plan view) which is disposed on the tip ends (free ends, i.e., end portions in the +X direction) of the bridge parts 54 and 55, and which mechanically connects these bridge parts 54 and 55.

The fixed end (end portion in the −X direction) of the bridge part 54 is mechanically connected to the substrate 51 via a leg part 52 which has a rising part that rises from the substrate 51 via a wiring pattern 58 (omitted from FIG. 6) consisting of an Al film that is formed on top of an insulating film 57 such as a silicon oxide film formed on the substrate 51. Similarly, the fixed end (end portion in the −X direction) of the bridge part 55 is mechanically connected to the substrate 51 via a wiring pattern (not shown in the figures) consisting of an Al film that is formed on top of the insulating film 57. Furthermore, the free ends of the bridge parts 54 and 55 are mechanically connected to each other via the connecting part 56 as was described above. Accordingly, in the present working configuration, the bridge parts 54 and 55 and connecting part 56 as a whole form a movable part that has a cantilever structure. In the present working configuration, mechanically stable support is possible as a result of the use of two bridge parts 54 and 55; however, the number of bridge parts may also be one, or may be three or more. Furthermore, in the present working configuration, the substrate 51 and insulating film 57 form a fixed part.

The bridge part 54 has two bridge constituent parts 61 and 62 that are mechanically connected in series in the direction of the X axis between the fixed end and free end of the movable part, and a connecting part 63 that is interposed between these two bridge constituent parts. Both of the bridge constituent parts 61 and 62 are constructed in a band-form plate shape that extends in the direction of the X axis in a plan view seen from the direction of the Z axis. Both the bridge constituent part 61 on the side of the fixed end (−X side) and the bridge constituent part 62 on the side of the free end (+X side) constitute plate spring parts that can flex in the direction of the Z axis. However, as is shown in FIG. 7, in a state in which no driving signal is supplied, the bridge constituent part 61 is bent upward (i.e., in the +Z direction toward the opposite side from the substrate 51), while the bridge constituent part 62 is bent downward (i.e., in the −Z direction toward the substrate 51), so that both of these bridge constituent parts have different bent or non-bent states. Of course, in the present working configuration, for example, it would also be possible to cause both of the bridge constituent parts 61 and 62 to have different bent or non-bent states by causing both of the bridge constituent parts 61 and 62 to bend upward, and setting the curvature of the bridge constituent part 62 at a smaller value than the curvature of the bridge constituent part 61, in a state in which no driving signal is supplied.

In the present working configuration, the bridge constituent part 61 is a two-layer thin film which is produced by laminating a lower-side SiN film 71 and an upper-side Al film 72, and is constructed so that this bridge constituent part acts as a plate spring part. The bridge constituent part 62 is formed by a two-layer thin film which is produced by laminating a lower-side Al film 73 and an SiN film 71 which is formed by continuously extending the SiN film 71 constituting the lower-side film in the bridge constituent part 61 "as is" via the connecting part 63 so that this film becomes the upper-side film in the bridge constituent part 62. In the present working configuration, as a result of the order of lamination of the SiN film and Al film of the bridge constituent part 61 and bridge constituent part 62 thus being reversed, the direction of bending of the two bridge constituent parts is reversed in a state in which no driving signal is supplied.

The connecting part 63 that makes up a part of the bridge part 54 mechanically connects the end parts of the bridge constituent parts 61 and 62 to each other, and is constructed from a three-layer thin film in which an SiN film 71 that is extended "as is" as a continuation of the bridge constituent parts 61 and 62, an Al film 72 that is extended "as is" as a continuation of the bridge constituent part 61, and an Al film 73 that is extended "as is" from the bridge constituent part 62, are laminated in the order of the film 73, film 71 and film 72 from the lower side. However, in the connecting part 63, an opening 63a is formed in the SiN film 71, a thin film consisting of the two layers of the Al films 72 and 73 is formed at the location of the opening 63a, and the Al films 72 and 73 are electrically connected to each other at the location of the opening 63a.

In the present working configuration, the leg part 52 is formed by continuously extending "as is" the SiN film 71 and Al film 72 that form the bridge constituent part 61. The Al film 72 is electrically connected to a wiring pattern 58 via an opening formed in the SiN film 71 in the leg part 52. Furthermore, a protruding strip part 59 is formed in a square shape (in a plan view seen from the Z direction) on the upper part of the leg part 52 in order to reinforce the strength of the leg part 52.

The bridge part 55 and leg part 53 respectively have exactly the same structures as the bridge part 54 and leg part 52 described above. The bridge constituent parts 64 an 65 and connecting part 66 that constitute the bridge part 55 correspond to the bridge constituent parts 61 and 62 and connecting part 63 that constitute the bridge part 54. The opening 66a in the connecting part 66 corresponds to the opening 63a in the connecting part 63, and the Al film 74 that forms a part of the bridge constituent part 64 corresponds to the Al film 72 that forms a part of the bridge constituent part 61 described above. Furthermore, a protruding strip part 60 that corresponds to the protruding strip part 59 described above is formed on the upper part of the leg part 53.

The connecting part 56 is constructed by continuously extending the SiN film 71 and Al film 73 that constitute the bridge constituent parts 62 and 65 "as is." A rising part 56a is formed in a square shape (as seen in a plan view seen from the direction of the Z axis) on the connecting part 56 in the vicinity of the outer periphery of this connecting part 56; as a result, the connecting part 56 is reinforced, and the mirror 2 can be installed on the planar part of the connecting part 56. A mirror 2 consisting of Au, Ni or some other metal is disposed as a driven body on the planar part of the connecting part 56.

As is clear from the above description, an electric current pathway which extends from the wiring pattern 58 beneath the leg part 52 to a wiring pattern (not shown in the figures) beneath the leg part 53 via the bridge constituent part 61→connecting part 63→bridge constituent part 62→connecting part 56→bridge constituent part 65→connecting part 66→bridge constituent part 64 is formed by the Al films 72, 73 and 74. Within this electric current pathway, the electric current pathway that runs along the direction of the Y axis in the connecting part 56 (direction of current flow: −Y direction) constitutes a part that generates a Lorentz force that is oriented toward the substrate 51 (i.e., in the −Z direction) when this part is placed in a magnetic field that is oriented in the direction of the X axis. Accordingly, when this part is placed in a magnetic field oriented in the direction of the X axis using a permanent magnet, etc. (not shown in the figures), and an electric current (driving signal) is caused to flow through the electric current pathway described above, a Lorentz force (driving force) acts in the −Z direction on the Al film 71 in the connecting part 56, so that the connecting part 56 is drawn toward the substrate 51 against the spring force (internal stress) of the bridge constituent parts 61, 62, 64 and 65. Consequently, the bridge constituent parts 61, 62, 64 and 65 are deformed. Furthermore, the connecting part 56 stops in a position where this connecting part 56 contacts the substrate 51; as a result, a state is produced in which the mirror 2 is moved into a position that is in close proximity to the substrate 51. On the other hand, when this current is not caused to flow, no Lorentz force (driving force) acts on the Al film 71 in the connecting part 56, so that the connecting part 56 is caused to return to the state shown in FIG. 7 by the spring force (internal stress) of the bridge constituent parts 61, 62, 64 and 65, and the mirror 2 returns to the original upper position that is separated from the substrate 51.

Thus, in the present working configuration, driving is accomplished by means of a Lorentz force that is created by the driving signal. Of course, if a fixed electrode is disposed on the side of the substrate 51 as in the first working configuration describe above, driving can also be accomplished by means of an electrostatic force.

Figure 9:
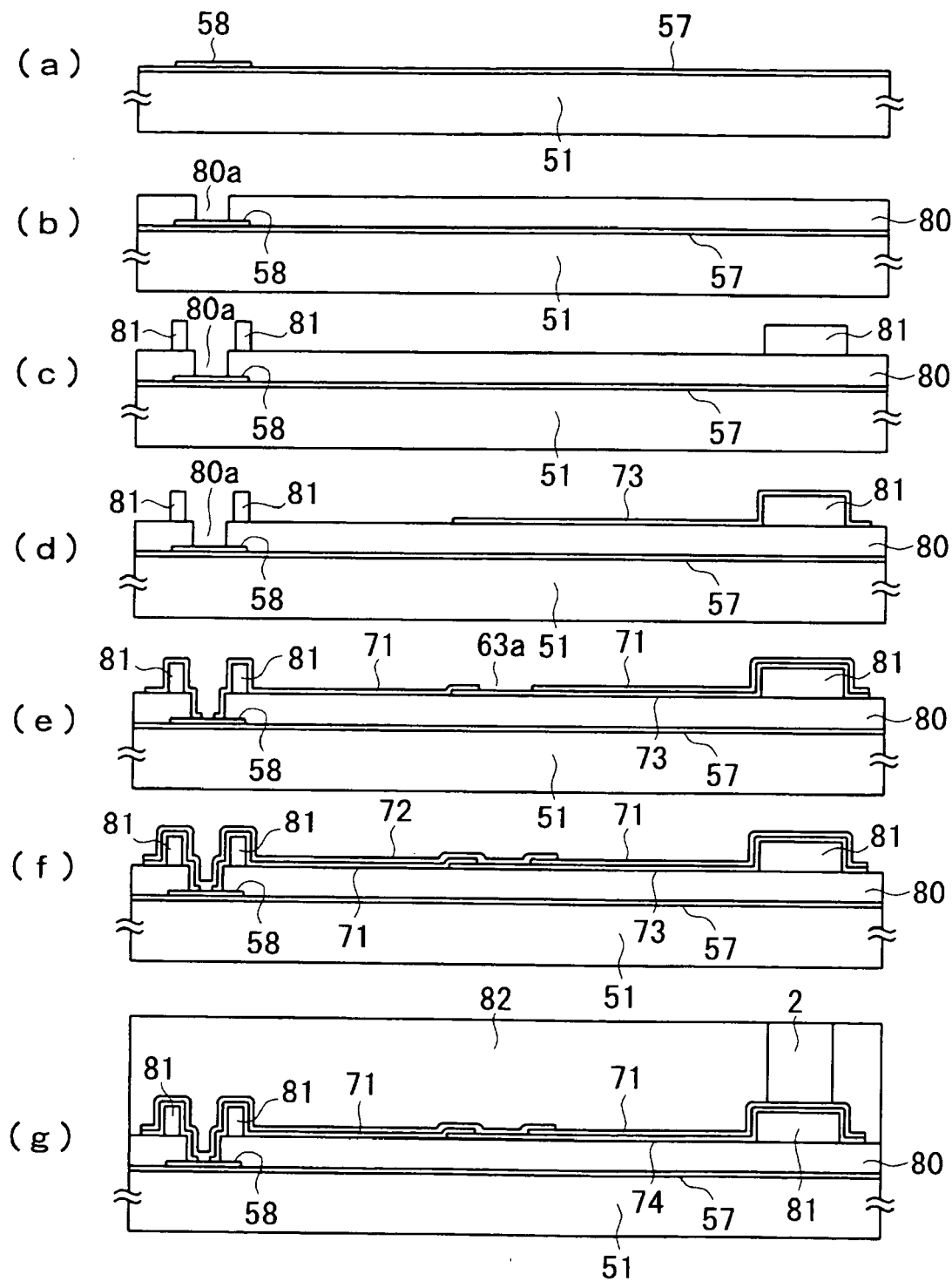
FIG. 9 is a schematic sectional view which respectively shows in model form individual steps of the method for manufacturing the microactuator shown in FIGS. 6 through 8.

Next, one example of the method for manufacturing the microactuator 41 of the present working configuration will be described with reference to FIG. 9. FIG. 9 is a schematic sectional view which respectively shows in model form individual steps of this manufacturing method; this figure corresponds to FIG. 7.

First, a silicon oxide film 57 is formed by thermal oxidation on the upper surface of the silicon substrate 51. Then, after an Al film is deposited on top of this silicon oxide film by means of a vacuum deposition or sputtering method, etc., this Al film is patterned into the shapes of the wiring pattern 58 and other wiring patterns by means of a photolithographic etching method (FIG. 9(*a*)). Next, the surface of the substrate in this state is coated with a resist 80 which constitutes a sacrificial layer, and openings 80*a* respectively corresponding to the contact parts of the leg parts 52 and 53 are formed in this resist 80 by means of a photolithographic etching method (FIG. 9(*b*)).

Next, the entire surface of the substrate in the state shown in FIG. 9(*b*) is coated with a resist 81 that constitutes a sacrificial layer, and portions of the resist 81 other than the portions corresponding to the protruding strip parts 59 and 60 and the rising part 56*a* are removed by a photolithographic etching method so that only these corresponding portions are left in island form (FIG. 9(*c*)).

Next, after an Al film that is to form the Al film 73 that constitutes the bridge constituent parts 62 and 65 and connecting parts 56, 63 and 66 is formed by a vacuum deposition or sputtering method, etc., patterning is performed by a photolithographic etching method, so that the shape of the Al film 73 is formed (FIG. 9(*d*)).

Subsequently, after an SiN film that is to form the SiN film 71 that constitutes the bridge constituent parts 61, 62, 64 and 65, the connecting parts 56, 63 and 66 and the leg parts 52 and 53 is formed by a plasma CVD method, etc., patterning is performed by a photolithographic etching method so that the shape of the SiN film 71 is formed (FIG. 9(*e*)). In this case, openings are formed in the contact parts in the leg parts 52 and 53, and the openings 63*a* and 66*a* of the connecting parts 63 and 66 are formed.

Next, after the Al films that are to form the Al films 72 an 74 that constitute the leg parts 52 and 53 and bridge constituent parts 61 and 64 are deposited by a vacuum deposition or sputtering method, etc., patterning is performed by a photolithographic etching method so that the shapes of the Al films 72 and 74 are formed (FIG. 9(*f*)).

Subsequently, the entire surface of the substrate in the state shown in FIG. 9(*f*) is thickly coated with a resist 82 that constitutes a sacrificial layer, and this resist 82 is exposed and developed so that a region in which the mirror 2 is grown is formed in the resist 82. Then, Au, Ni or some other metal that constitutes the mirror 2 is grown by electroplating (FIG. 9(*g*)). Finally, the resists 80 through 82 are removed by a plasma ashing method, etc. As a result, the microactuator 41 of the present working configuration is completed.

Furthermore, as was described above, the formation of the film 71 and films 72 and 74 is performed under conditions which are such that the bridge constituent parts 61 and 64 are bent upward by the stress that is generated during film formation when the resists 80 through 82 are removed. Moreover, the formation of the film 71 and film 73 is performed under conditions which are such that the bridge constituent parts 62 and 65 are bent downward by the stress that is generated during film formation when the resists 80 through 82 are removed.

The present working configuration differs from the prior art described above in that the bridge parts 54 and 55 are not constructed only from uniform plate spring parts; instead, the bridge parts 54 and 55 are constructed from bridge constituent parts 61 and 64 on the side of the fixed end, which are plate spring parts that are bent in the +Z direction in a state in which no force is received, and bridge constituent parts 62 and 65 on the side of the free end, which are plate spring parts that are bent in the −Z direction in a state in which no force is received. Accordingly, the length from the fixed end to the free end of the movable part can be lengthened; furthermore, the distance between the substrate 51 and the connecting part 56 on which the Lorentz force acts in the state shown in FIG. 7 in which the movable part receives no force can be shortened. Consequently, the position of the connecting part 56 on the free end side on which the Lorentz force acts can be set as a position that is distant from the fixed end of the movable part, and that is relatively close to the substrate 51 in the state shown in FIG. 7 in which no driving signal is supplied. Accordingly, in the present working configuration, operation can be accomplished using a small driving force, so that the microactuator 41 can be operated at a low power.

To provide a supplementary description, if the distance between the connecting part 56 and substrate 51 in the state shown in FIG. 7 in which no driving signal is supplied is longer than the desired movement stroke of the mirror 2 by an amount that is greater than necessary, then the Lorentz force that is required in order to cause the current to flow and move the connecting part 56 against the spring force of the bridge parts 54 and 55 to a state in which this connecting part 56 contacts the substrate 51 is inevitably increased. However, in the present working configuration, the distance between the connecting part 56 and the substrate 51 can be set at approximately the desired movement stroke in the state shown in FIG. 7 while increasing the length of the bridge parts 54 and 55; accordingly, the required Lorentz force can be reduced.

Thus, in the present working configuration, since the bridge constituent parts 61 and 64 and the bridge constituent parts 62 and 65 have different bent or non-bent states in a state in which the movable part receives no force, the distance of the free end portion of the movable part from the substrate 51 in a state in which the movable part receives no force can be freely set at the desired distance while increasing the length from the fixed end to the free end of the movable part. As a result, this microactuator 41 can be operated with a small driving force. In the case of the present working configuration, in particular, since the bridge constituent parts 62 and 65 on the side of the free end that are bent in the −Z direction in a state in which no force is received are used instead of the bridge constituent part 15 (on the side of the free end) constituting a flat-plate-form rigid part used in the first working configuration, the distance of the free end portion of the movable part from the substrate 51 in a state in which the movable part receives no force can be freely set at the desired distance while increasing the length from the fixed end to the free end of the movable part even more than in the case of the first working configuration. As a result, this microactuator 41 can be operated with an even smaller driving force.

(Third Working Configuration)

Figure 10:
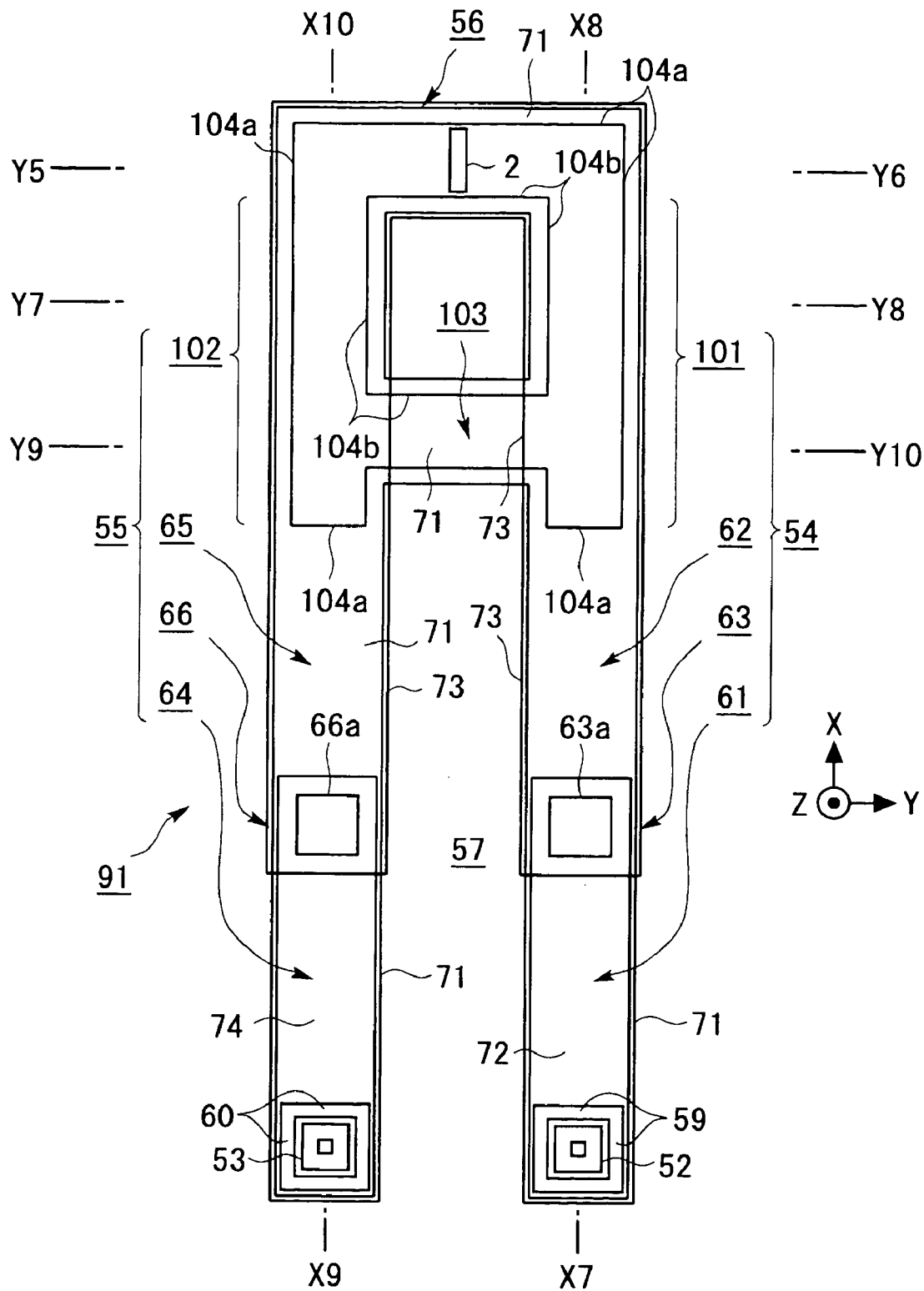
FIG. 10 is a schematic plan view which shows in model form a microactuator constituting a third working configuration of the present invention and a mirror that is driven by this microactuator.
Figure 11:
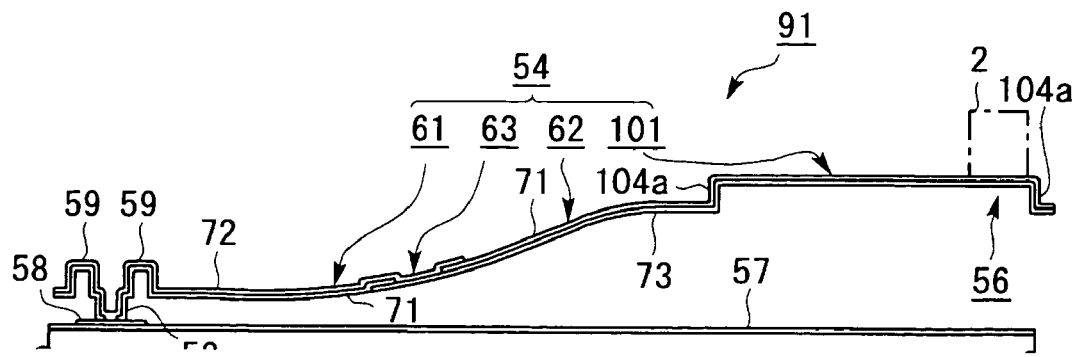
FIG. 11 is a schematic sectional view along line X7-X8 in FIG. 10.
Figure 12:
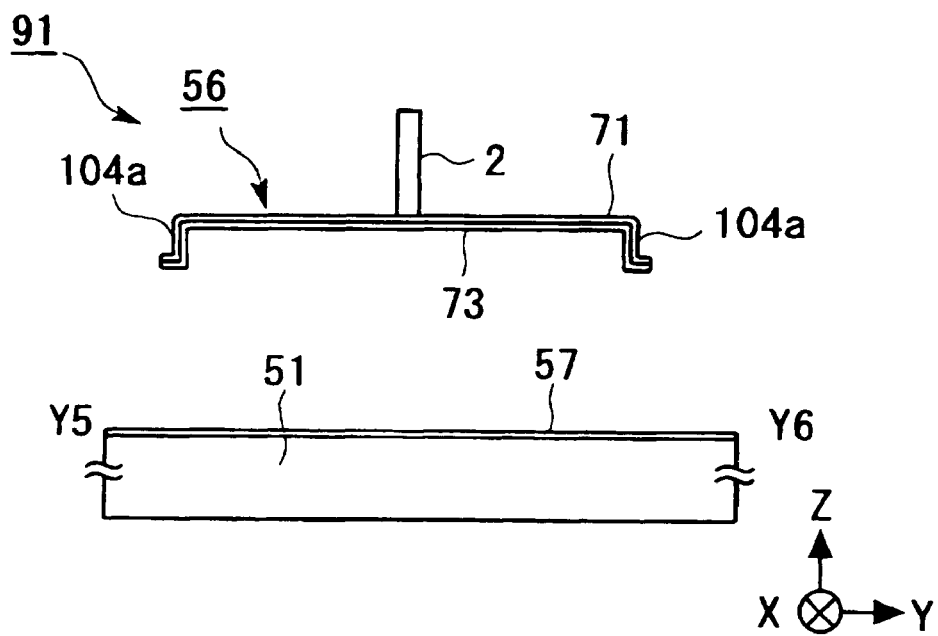
FIG. 12 is a schematic sectional view along line Y5-Y6 in FIG. 10.
Figure 13:
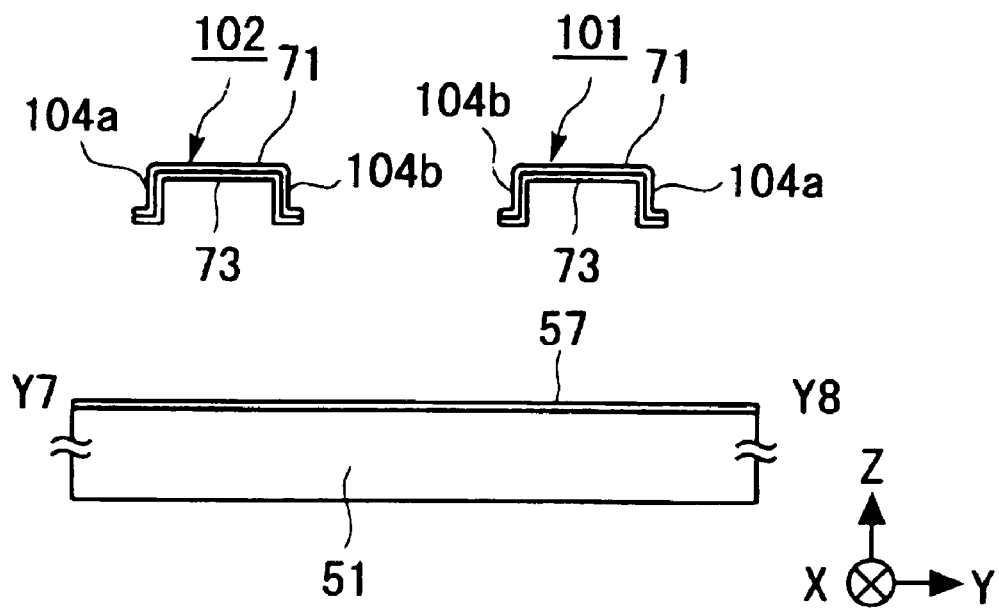
FIG. 13 is a schematic sectional view along line Y7-Y8 in FIG. 10.
Figure 14:
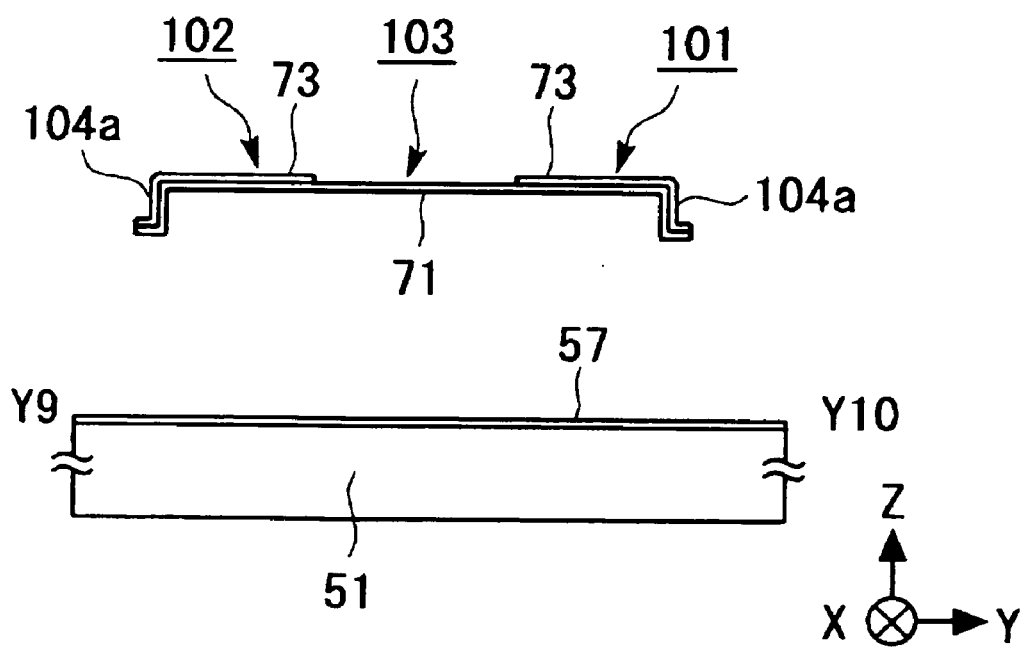
FIG. 14 is a schematic sectional view along line Y9-Y10 in FIG. 10.

FIG. 10 is a schematic plan view which shows in model form a microactuator 91 that constitutes a third working configuration of the present invention and a mirror 2 that is driven by this microactuator. In FIG. 10, lines that should naturally be broken lines (hidden lines) are also shown as solid lines. FIG. 11 is a schematic sectional view along line X7-X8 in FIG. 10. Although this is not shown in the figures, a schematic sectional view along line X9-X10 in FIG. 10 is the same as FIG. 11. FIG. 12 is a schematic sectional view along line Y5-Y6 in FIG. 10. FIG. 13 is a schematic sectional view along line Y7-Y8 in FIG. 10. FIG. 14 is a schematic sectional view along line Y9-Y10 in FIG. 10. Furthermore, FIGS. 11 through 14 show a state in which no driving signal is supplied (i.e., a state in which the movable part receives no force).

In FIGS. 10 through 14, elements that are the same as in FIGS. 6 through 8, or that correspond to elements in FIGS. 6 through 8, are labeled with the same symbols, and a redundant description is omitted. The points of difference between this working configuration and the second working configuration are only those points that are described below.

In the present working configuration, a band-plate-form bridge constituent part 101 that extends in the direction of the X axis is added in the bridge part 54 between the end portion on the free end side of the bridge constituent part 62 and the connecting part 56. Similarly, in the bridge part 55, a band-plate-form bridge constituent part 102 that extends in the direction of the X axis is added between the end portion on the free end side of the bridge constituent part 65 and the connecting part 56. The bridge constituent parts 101 and 102 constitute rigid parts that possess substantial rigidity against flexing in the direction of the Z axis (toward the substrate 51 and toward the opposite side from this substrate) and flexing in other directions.

The bridge constituent part 101 is formed by a two-layer thin film in which the upper-side SiN film 71 and lower-side Al film 73 that extend continuously "as is" from the bridge constituent part 62 and connecting part 56 are laminated. The bridge constituent part 102 is formed by a two-layer thin film in which the upper-side SiN film 71 and lower-side Al film 73 that extend continuously "as is" from the bridge constituent part 65 and connecting part 56 are laminated.

In order to improve the mechanical strength, the free ends of the bridge constituent parts 101 and 102 are mechanically connected to each other by a band-plate-form connecting part 103 that extends in the direction of the Y axis. The connecting part 103 is formed by the SiN film 71, which is caused to extend continuously "as is" from the bridge constituent parts 101 and 102. The Al film 73 from the bridge constituent parts 101 and 102 does not extend to the connecting part 103; no electrical connections are made in the connecting part 103.

In the present working configuration, an electric current pathway that extends from the wiring pattern 58 beneath the leg part 52 to a wiring pattern (not shown in the figures) beneath the leg part 53 via the bridge constituent part 61→connecting part 63→bridge constituent part 62→bridge constituent part 101→connecting part 56→bridge constituent part 102→bridge constituent part 65→connecting part 66→bridge constituent part 64 is formed by the Al films 72, 73 and 74. Within this electric current pathway, as in the second working configuration, the electric current pathway that runs along the direction of the Y axis in the connecting part 56 (direction of current flow: −Y direction) constitutes a part that generates a Lorentz force that is oriented toward the substrate 51 (i.e., in the −Z direction) when this part is placed in a magnetic field that is oriented in the direction of the X axis.

In the present working configuration, instead of the rising part 56a shown in FIG. 6, in order to impart rigidity to the bridge constituent parts 101 and 102 and connecting parts 56 and 103 in a comprehensive manner, a rising part 104a is formed on the side of the outer periphery of these collected regions (as seen in a plan view) so as to surround these regions on the outside, and a rising part 104b is formed on the side of the inner periphery of these collected regions so as to make an internal circuit, as shown in FIG. 10. The bridge constituent parts 101 and 102 are reinforced by these rising parts 104a and 104b so that these bridge constituent parts 101 and 102 possess rigidity. The bridge constituent parts 101 and 102 show no substantial bending in the direction of the Z axis regardless of the presence or absence of a driving signal, and possess rigidity as described above; accordingly, these bridge constituent parts 101 and 102 are not bent by stress in the films 71 and 73, and always maintain a flat-plate-form state.

Furthermore, the microactuator 91 of the present working configuration can also be manufactured by a manufacturing method similar to that used for the microactuator 41 of the second working configuration.

Advantages similar to those of the second working configuration are obtained using the present working configuration. In the present working configuration, furthermore, since the bridge constituent parts 101 and 102 that constitute flat-plate-form rigid parts are added, the bridge parts 54 and 55 can be made even longer, so that the device can be operated with a smaller driving force. Moreover, in the present working configuration, as is shown in FIG. 11, the mirror 2 can be placed in a vertical standing attitude in a state in which no driving signal is supplied.

In addition, in the present working configuration, a bridge constituent part 61 (i.e., a plate spring part that is bent in the +Z direction in a state in which no force is received), a bridge constituent part 62 (i.e., a plate spring part that is bent in the −Z direction in a state in which no force is received) and a bridge constituent part 101 (i.e., a flat-plate-form rigid part) are disposed in that order from the side of the fixed end to the side of the free end in the bridge part 54, and such bridge constituent parts are disposed in a similar order in the bridge part 55 as well; however, it would also be possible, for example, to alter the order of the bridge constituent part 62 and bridge constituent part 101, and to alter the order of the bridge constituent part 65 and bridge constituent part 102. Advantages similar to those of the present working configuration can also be obtained in such a case.

(Fourth Working Configuration)

Figure 15:
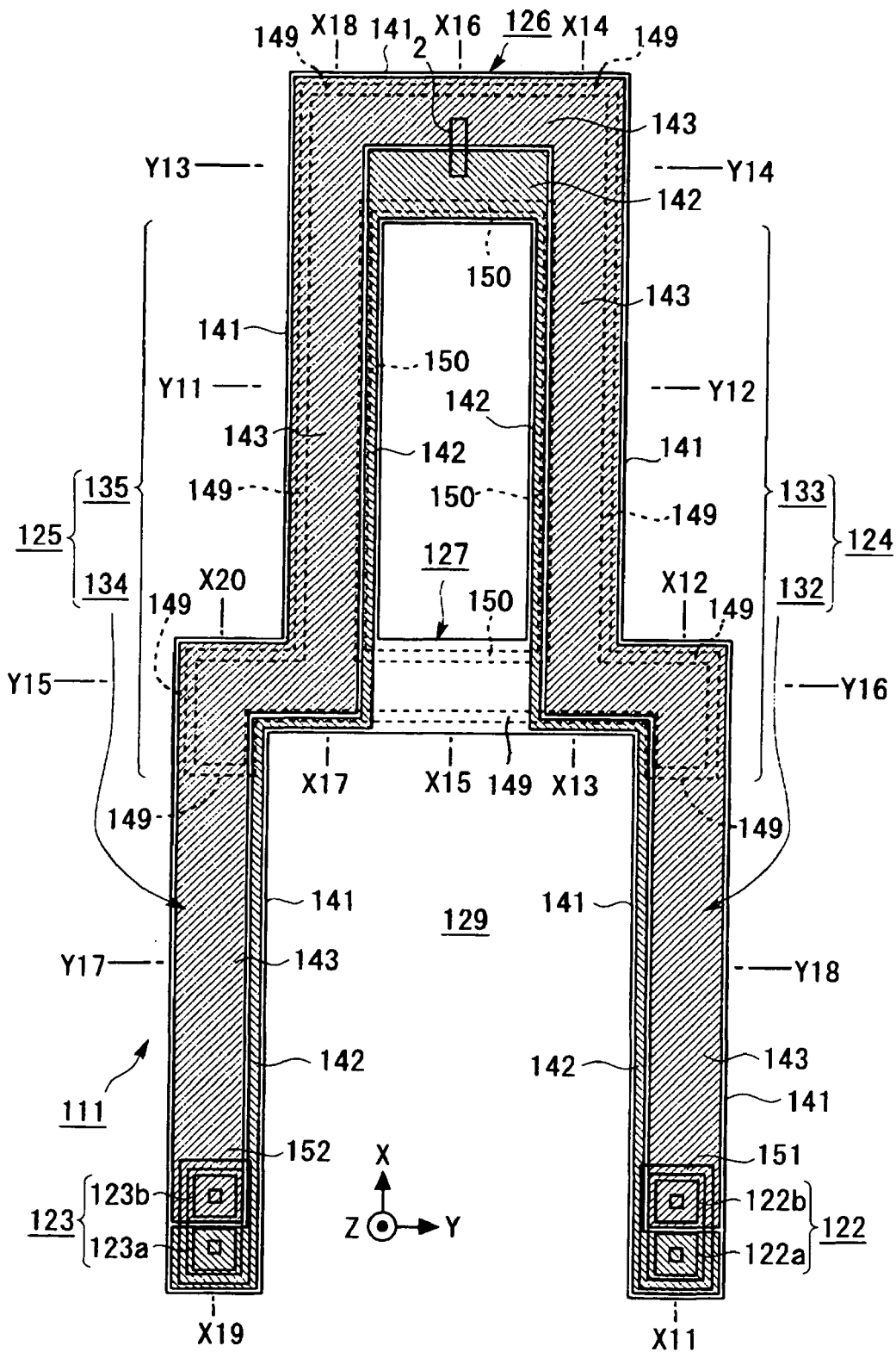
FIG. 15 is a schematic plan view which shows in model form a microactuator constituting a fourth working configuration of the present invention and a mirror that is driven by this microactuator.
Figure 16:
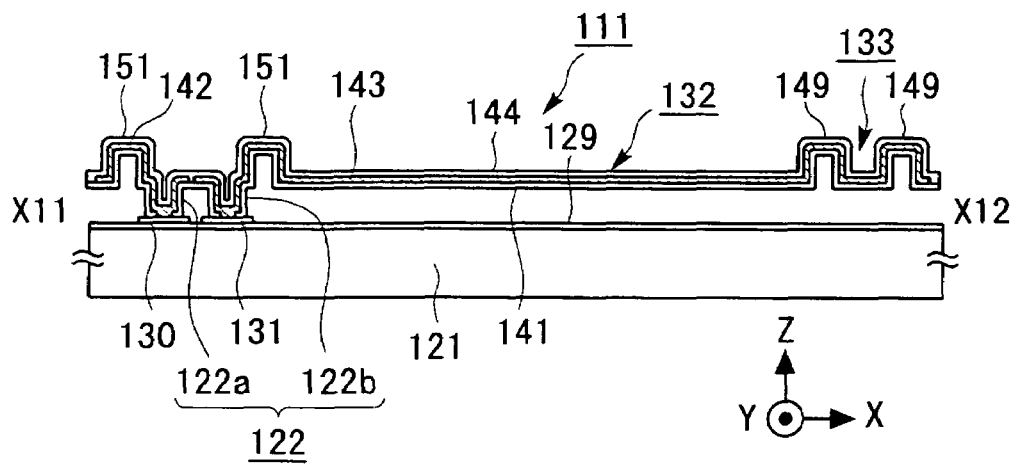
FIG. 16 is a schematic sectional view along line X11-X12 in FIG. 15.
Figure 17:
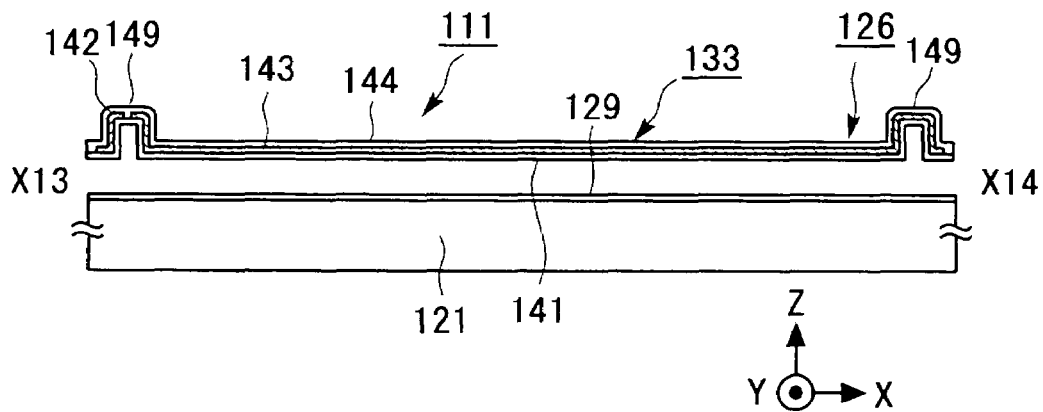
FIG. 17 is a schematic sectional view along line X13-X14 in FIG. 15.
Figure 18:
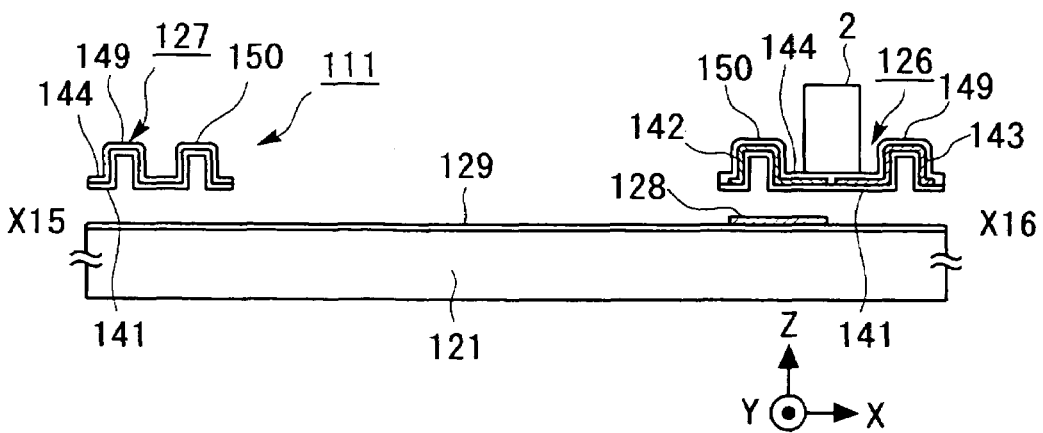
FIG. 18 is a schematic sectional view along line X15-X16 in FIG. 15.
Figure 19:
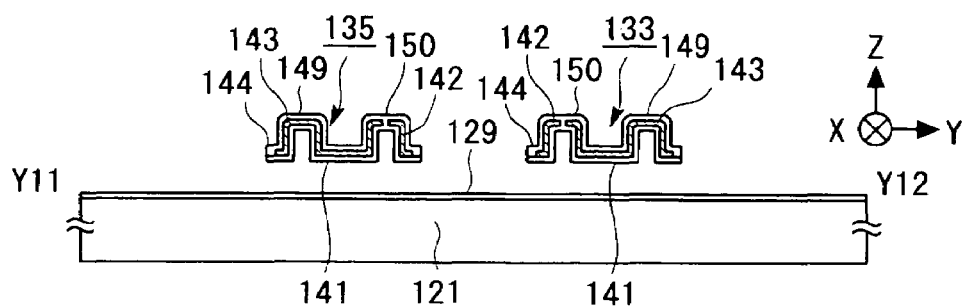
FIG. 19 is a schematic sectional view along line Y11-Y12 in FIG. 15.
Figure 20:
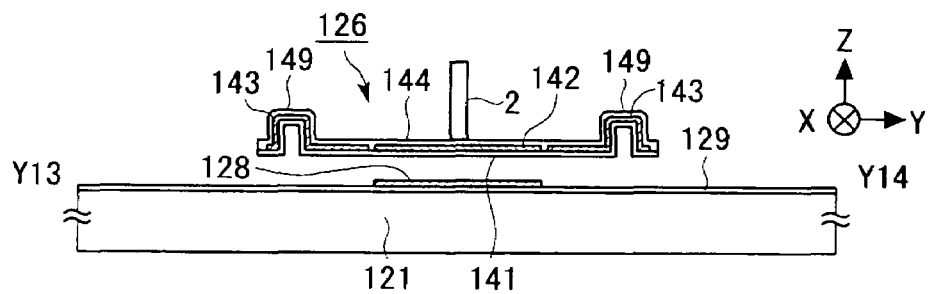
FIG. 20 is a schematic sectional view along line Y13-Y14 in FIG. 15.
Figure 21:
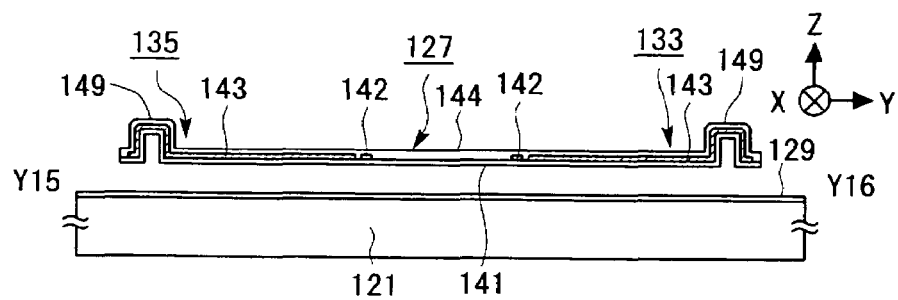
FIG. 21 is a schematic sectional view along line Y15-Y16 in FIG. 15.
Figure 22:
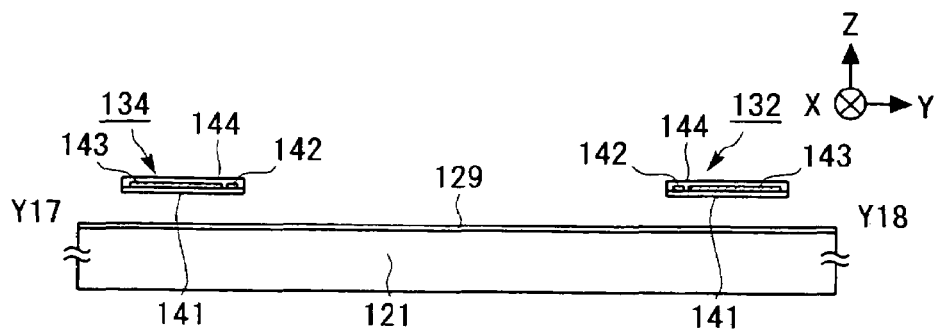
FIG. 22 is a schematic sectional view along line Y17-Y18 in FIG. 15.

FIG. 15 is a schematic plan view which shows in model form a microactuator 111 that constitutes a fourth working configuration of the present invention and a mirror 2 that is driven by this microactuator. In FIG. 15, the SiN film 144 used as a protective film that is formed over the entire surface of the movable part and leg part is omitted, and the lines of the protruding strip parts 149 and 150 that should naturally be drawn as solid lines are shown as broken lines; furthermore, respectively different hatching is applied to the Al films 142 and 143. FIG. 16 is a schematic sectional view along line X11-X12 in FIG. 15. Although this is not shown in the figures, a schematic sectional view along line X19-X20 in FIG. 15 is the same as FIG. 16. FIG. 17 is a schematic sectional view along line X13-X14 in FIG. 15. Although this is not shown in the figures, a schematic sectional view along line X17-X18 in FIG. 15 is the same as FIG. 17. FIG. 18 is a schematic sectional view along line X15-X16 in FIG. 15. FIG. 19 is a schematic sectional view along line Y11-Y12 in FIG. 15. FIG. 20 is a schematic sectional view along line Y13-Y14 in FIG. 15. FIG. 21 is a schematic sectional view along line Y15-Y16 in FIG. 15. FIG. 22 is a schematic sectional view along line Y17-Y18 in FIG. 15. Furthermore, in FIGS. 16 through 22, the bridge constituent parts 132 and 134 are shown as not being bent in the direction of the Z axis. In actuality, however, like the bridge constituent part 14 in FIG. 1, the bridge constituent parts 132 and 134 are bent in the +Z direction in a state in which the movable part receives no force.

The microactuator 1 of the first working configuration is constructed so that only an electrostatic force is used as the driving force, and the microactuators 41 and 91 of the second and third working configurations are constructed so that only a Lorentz force is used as the driving force. On the other hand, the microactuator 111 of the present working configuration is constructed so that both an electrostatic force and a Lorentz force are used as the driving force.

The microactuator 111 of the present working configuration comprises a substrate 121 such as a silicon substrate or glass substrate, leg parts 122 and 123, two band-plate-form bridge parts 124 and 125 that extend mainly parallel to each other in the direction of the X axis (in a plan view seen from the direction of the Z axis), a connecting part 126 with a rectangular shape (as seen in a plan view) which is disposed on the tip ends (free ends, i.e., end portions in the +X direction) of the bridge parts 124 and 125, and which mechanically connects these bridge parts to each other, a connecting part 127 which mechanically connects the bridge constituent part 133 constituting the bridge part 124 and the bridge constituent part 135 constituting the bridge part 125 to each other on the side of the fixed ends of these parts in order to reinforce these parts, and a fixed electrode 128.

The fixed end (end portion in the −X direction) of the bridge part 124 is mechanically connected to the substrate 121 via the leg part 122, which consists of two separate leg parts 122a and 122b that have rising parts that respectively rise from the substrate 121 via wiring patterns 130 and 131 (omitted from FIG. 15) consisting of Al films that are formed on top of an insulating film 129 such as a silicon oxide film on the substrate 121. Similarly, the fixed end (end portion in the −X direction) of the bridge part 125 is mechanically connected to the substrate 121 via the leg part 123, which consists of two separate leg parts 123a and 123b that have rising parts that respectively rise from the substrate 121 via two wiring patterns (not shown in the figures) consisting of Al films that are formed on top of the insulating film 129 on the substrate 121. As was described above, the free ends of the bridge parts 124 and 125 are mechanically connected to each other by the connecting part 126, and the fixed ends of the bridge constituent parts 132 and 134 are mechanically connected to each other by the connecting part 127. Accordingly, in the present working configuration, the bridge parts 124 and 125 and connecting parts 126 and 127 as a whole constitute a movable part that has a cantilever structure. In the present working configuration, the substrate 121, fixed electrode 128 and insulating film 129 constitute a fixed part.

The bridge part 124 has two bridge constituent parts 132 and 133 that are mechanically connected in series in the direction of the X axis between the fixed end and free end of the movable part. The bridge constituent part 132 is constructed in a band-form plate shape that extends in the direction of the X axis (in a plan view seen from the direction of the Z axis). The bridge constituent part 133 is formed in a band-form plate shape, and as is shown in FIG. 15, this part has a shape that extends mainly in the direction of the X axis (in a plan view seen from the direction of the Z axis), but that is bent in the direction of the Y axis in a position on the −X side. The bridge constituent part 132 on the side of the fixed end (−X side) is formed as a plate spring part that can flex in the direction of the Z axis; on the other hand, the bridge constituent part 133 on the side of the free end (+X side) is formed as a rigid part that has substantial rigidity against flexing in the direction of the Z axis (toward the substrate 121 and toward the opposite side from this substrate) and flexing in other directions.

The bridge constituent part 132 is a three-layer thin film (two-layer thin film in the gap between the Al films 142 and 143) in which the lower-side SiN film 141, intermediate Al films 142 and 143 and SiN film 144 used as an upper-side protective film are laminated, and is constructed so that this part operates as a plate spring. The Al film 142 and Al film 143 are formed as films at the same level; however, as is shown in FIG. 15, these films are formed with a slight gap opened in the direction of the Y axis, so that the films are electrically separated from each other. The reason for this is that the Al film 142 is used as wiring to the movable electrode used for the electrostatic force, while the Al film 143 is used as wiring to form an electric current pathway that is used for the Lorentz force. Almost no current is caused to flow through the wiring used for the electrostatic force, while a relatively large current is caused to flow through the wiring used for the Lorentz force. Accordingly, in order to reduce the electrical resistance of the wiring used for the Lorentz force, the Al film 142 is formed with a narrow width, while the Al film 143 is formed with a broad width.

The bridge constituent part 133 is constructed as a thin film consisting of three layers (two layers in the gap between the Al films 142 and 143) in which the lower-side SiN film 141, intermediate Al films 142 and 143 and SiN film 144 used as an upper-side protective film (these films extending continuously "as is" from the bridge constituent part 132) are laminated. However, the bridge constituent part 133 is endowed with the rigidity described above by forming protruding strip parts 149 and 150 (described later).

In FIG. 16, the bridge constituent part 132 is shown as not being bent in the direction of the Z axis. In actuality, however, the bridge constituent part 132, like the bridge constituent part 14 shown in FIG. 1, is bent upward (toward the opposite side from the substrate 121, i.e., in the +Z direction) by the stress of the films 141 through 144 in a state in which no driving signal is supplied. Such a bent state can be realized by appropriately setting the formation conditions of the films 141, 142 and 144. On the other hand, the bridge constituent part 133 is not substantially bent in the direction of the Z axis regardless of the presence or absence of a driving signal; as a result of possessing the rigidity described above, this bridge constituent part 133 always maintains a flat-plate-form state without being bent by the stress of the films 141 through 144. Thus, in a state in which the bridge part 124 receives no force, the bridge constituent part 132 and bridge constituent part 133 have different bent or non-bent states.

In the present working configuration, the leg part 122 is constructed by extending the SiN films 141 and 144 and Al films 142 and 143 (that constitute the bridge constituent part 132) continuously "as is"; this leg part 122 has two separate leg parts 122*a* and 122*b*. The reason that the leg part 122 has two separate leg parts 122*a* and 122*b* is to separate the wiring that is used for the electrostatic force and the wiring that is used for the Lorentz force, and to electrically connect the Al film 142 and Al film 143 to individual wiring patterns 130 and 131, respectively, on the substrate 121. The Al film 142 is electrically connected to the wiring pattern 130 via an opening formed in the SiN film 141 in the separate leg part 122*a*. The Al film 143 is electrically connected to the wiring pattern 131 via an opening formed in the SiN film 141 in the separate leg part 122*b*. Furthermore, on the upper part of the leg part 122, a protruding strip part 151 is formed in a square shape so as to surround the separate leg parts 122*a* and 122*b* (in a plan view seen from the Z direction) in a comprehensive manner in order to reinforce the strength of the leg part 122.

The bridge part 125 and leg part 123 respectively have exactly the same structures as the bridge part 124 and leg part 122 described above. The bridge constituent parts 134 and 135 that constitute the bridge part 125 correspond to the bridge constituent parts 132 and 133 that constitute the bridge part 124. The separate leg parts 123*a* and 123*b* that constitute the leg part 123 respectively correspond to the separate leg parts 122*a* and 122*b* that constitute the leg part 122. Furthermore, a protruding strip part 152 that corresponds to the protruding strip part 151 described above is formed on the upper part of the leg part 123.

The connecting part 127 is formed by a two-layer film consisting of the SiN films 141 and 144 that extend continuously "as is" from the bridge constituent parts 133 and 135. The Al films 142 and 143 from the bridge constituent parts 133 and 135 do not extend to the connecting part 127, so that no electrical connections are made in the connecting part 127.

In the present working configuration, in order to endow the bridge constituent parts 133 and 135 and connecting parts 126 and 127 with rigidity in a single operation, a protruding strip part 149 is formed so as to surround the outer periphery of this entire region (as seen in a plan view), and a protruding strip part 150 is formed so that this part runs around the inner periphery of this entire region, as shown by the broken lines in FIG. 15. The bridge constituent parts 133 and 135 are reinforced by these protruding strip parts 149 and 150, and thus possess rigidity. The bridge constituent parts 133 and 135 are not substantially bent in the direction of the Z axis regardless of the presence or absence of a driving signal. Since these parts possess the rigidity described above, the parts always maintain a flat-plate-form state without being bent by the stress of the films 141 through 144.

The connecting part 126 is constructed by continuously extending the SiN films 141 and 144 and Al films 142 and 143 that constitute the bridge constituent parts 133 and 135 "as is." A mirror 2 consisting of Au, Ni or some other metal is disposed as a driven body on the connecting part 126.

In the connecting part 126, the Al film 142 and Al film 143 are separated as shown in FIG. 15; a portion of the Al film 142 in the connecting part 126 also acts as a movable electrode use for the electrostatic force. A fixed electrode 128 used for the electrostatic force (consisting of an Al film) is formed in the region of the substrate 121 that faces this movable electrode. Although this is not shown in the figures, the Al film that constitutes the fixed electrode 128 is also extended as a wiring pattern, and is utilized together with the wiring pattern 130, so that a voltage can be applied as an electrostatic force driving signal across the fixed electrode 128 and the Al film 142 in the connecting part 126 that is also used as a movable electrode.

Meanwhile, as is seen from the above description, an electric current pathway that extends from the wiring pattern 131 beneath the separate leg part 122*b* of the leg part 122 to the wiring pattern (not shown in the figures) beneath the separate leg part 123*b* of the leg part 123 via the bridge constituent part 132→bridge constituent part 133→connecting part 126→bridge constituent part 135→bridge constituent part 134 is formed by the Al film 143. Within this electric current pathway, the electric current pathway that runs along the direction of the Y axis in the connecting part 126 (current flow direction: −Y direction) constitutes a part that generates a Lorentz force that is oriented toward the substrate 121 (in the −Z direction) when this part is placed in a magnetic field that is oriented in the direction of the X axis. Accordingly, when this part is placed in a magnetic field oriented in the direction of the X axis using a permanent magnet or the like (not shown in the figures), and a current (Lorentz force driving signal) is caused to flow through the electric current pathway described above, a Lorentz force (driving force) acts in the −Z direction on the Al film 143 in the connecting part 126.

Figure 23:
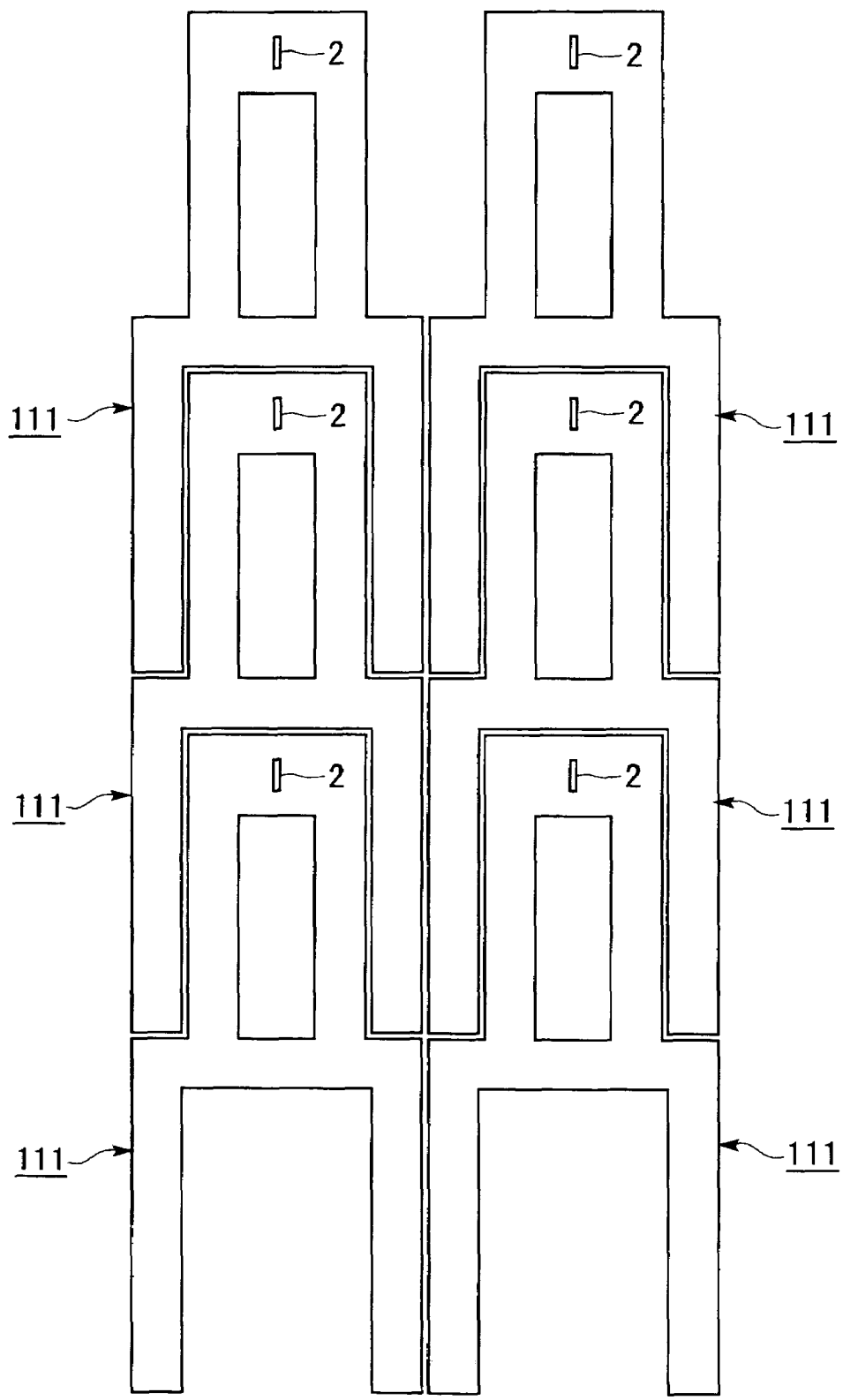
FIG. 23 is a schematic plan view which shows in model form an example of the disposition of a plurality of microactuators.

In the present working configuration, as is shown in FIG. 15, the bridge constituent parts 133 an 135 have a shape that is bent in the direction of the Y axis in a position on the −X side (in a plan view seen from the direction of the Z axis); as a result, since this is a shape which is such that intermediate parts of the bridge parts 124 and 125 are bent in the direction of the Y axis, the disposition density can be increased in cases where a plurality of microactuators 111 are disposed in a two-dimensional arrangement on the substrate 121 as shown in FIG. 23. Of course, in the present invention, the number of microactuators 111 mounted on the substrate 121 may be an arbitrary number of 1 or greater. This is also true of the first through third working configurations described above. FIG. 23 is a schematic plan view which shows in model form an example of the disposition of a plurality of microactuators 111.

Furthermore, in the present working configuration, an SiN film 144 is formed as a protective film over the entire surface of the movable part and leg part; however, this SiN film 144 may also be omitted. In this case, however, the SiN film 144 is left on the lower part of the mirror 2 in order to ensure electrical insulation of the Al films 142 and 143. Furthermore, a protective film corresponding to the SiN film 144 may also be formed in the first through third working configurations described above.

The microactuator 111 of the present working configuration can also be manufactured by the same manufacturing method as that used for the microactuators 1, 41 and 91 of the first through third working configurations.

In the present working configuration, both a Lorentz force and an electrostatic force can be used as a driving force. For example, once the connecting part 126 has been pushed downward toward the substrate 121 by a Lorentz force alone or by both a Lorentz force and an electrostatic force so that the connecting part 126 contacts the substrate 121 or reaches a set position just short of the substrate 121, the Lorentz force can be cut off, and the connecting part 126 can be held in a state of contact with the substrate 121 by the electrostatic force alone.

In the present working configuration, unlike the prior art described above, the bridge parts 124 and 125 are not constructed from single uniform plate spring parts alone; instead, the bridge parts 124 and 125 are constructed from bridge constituent parts 132 and 134 on the side of the fixed end, which are plate spring parts that are bent in the +Z direction in a state in which no force is received, and bridge constituent parts 133 and 135 which are rigid parts on the side of the free end that always maintain a flat-plate-form shape. Accordingly, the length from the fixed end to the free end of the movable part can be increased, and the distance between the substrate 121 and the connecting part 126 on which the Lorentz force and/or electrostatic force acts in a state in which the movable part receives no force can be shortened. Consequently, the position of the connecting part 126 on which the driving force on the free end side acts can be set as a position that is distant from the fixed end of the movable part, and that is relatively close to the substrate 121 in a state in which no driving signal is supplied. Accordingly, in the present working configuration, the microactuator can be operated with a small driving force, so that the microactuator 111 can be operated at a low power.

(Fifth Working Configuration)

Figure 24:
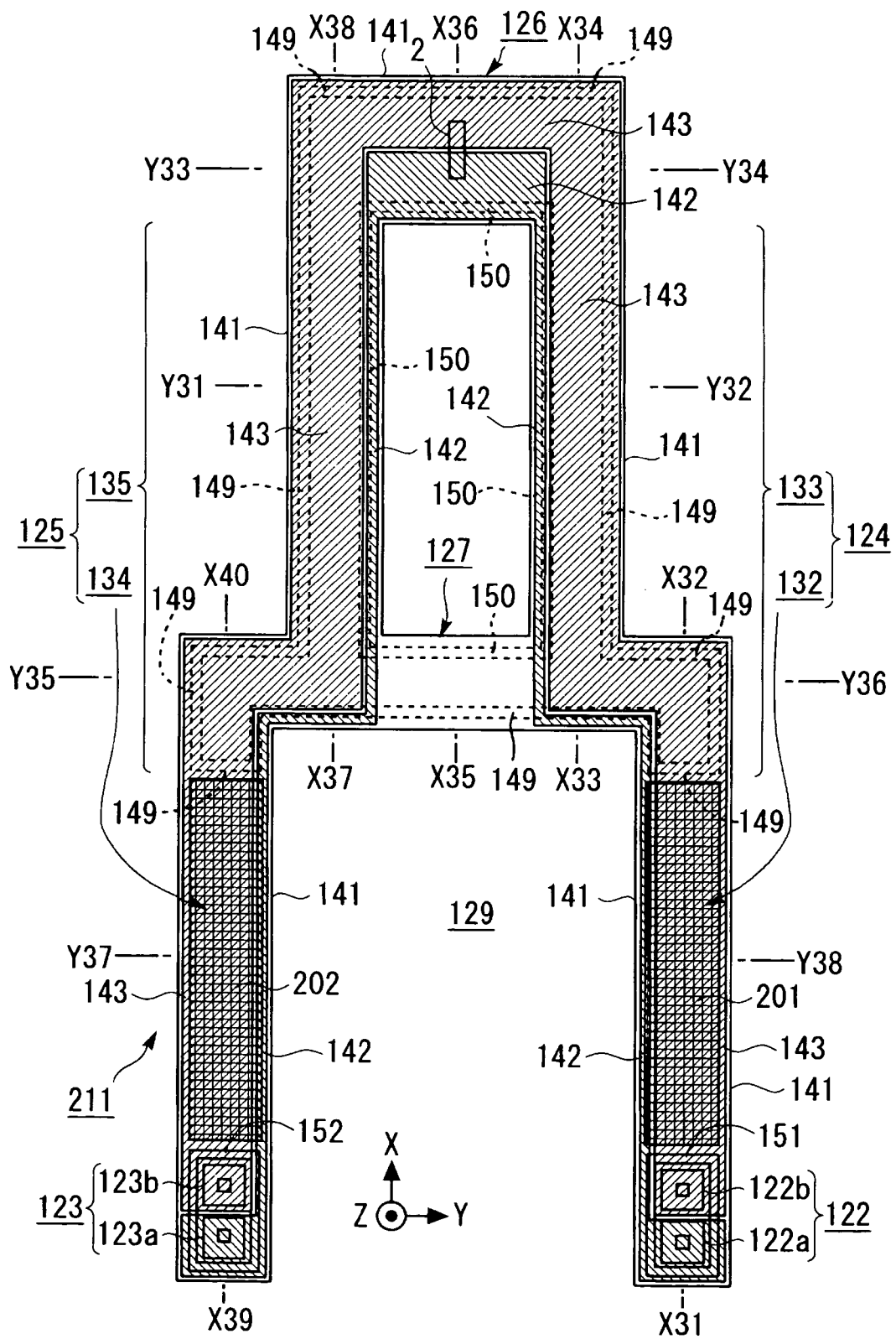
FIG. 24 is a schematic plan view which shows in model form a microactuator constituting a fifth working configuration of the present invention and a mirror that is driven by this microactuator.
Figure 25:
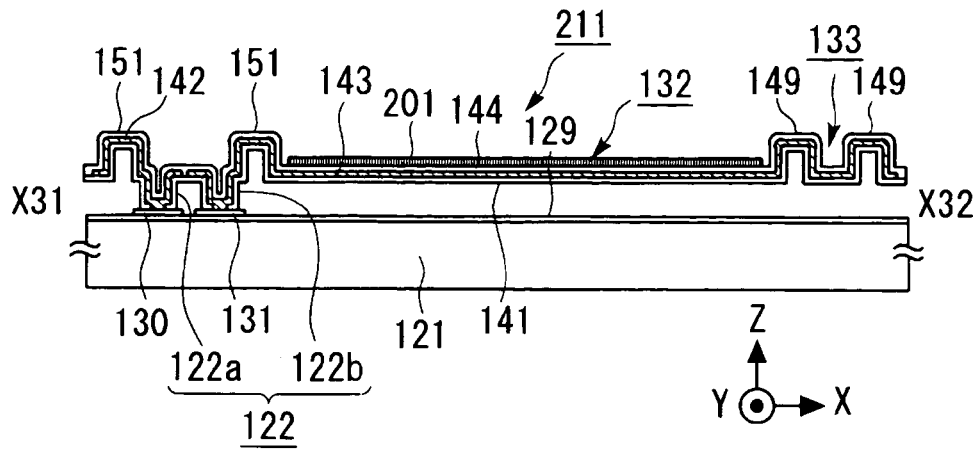
FIG. 25 is a schematic sectional view along line X31-X32 in FIG. 24.
Figure 26:
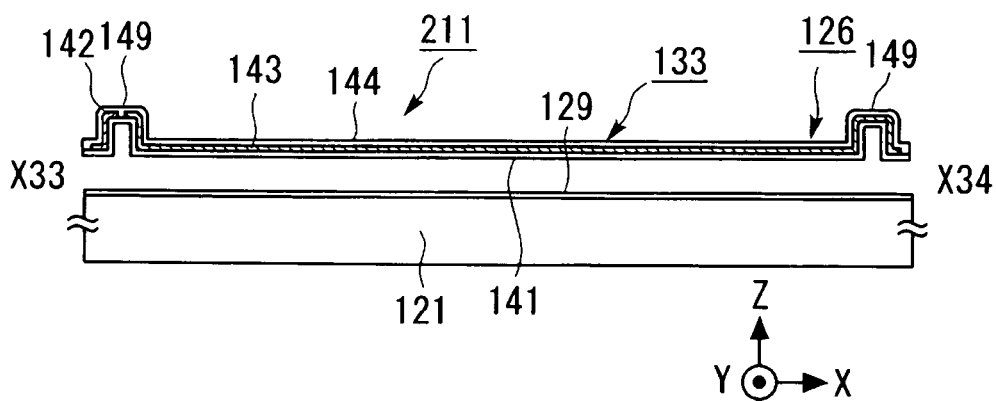
FIG. 26 is a schematic sectional view along line X33-X34 in FIG. 24.
Figure 27:
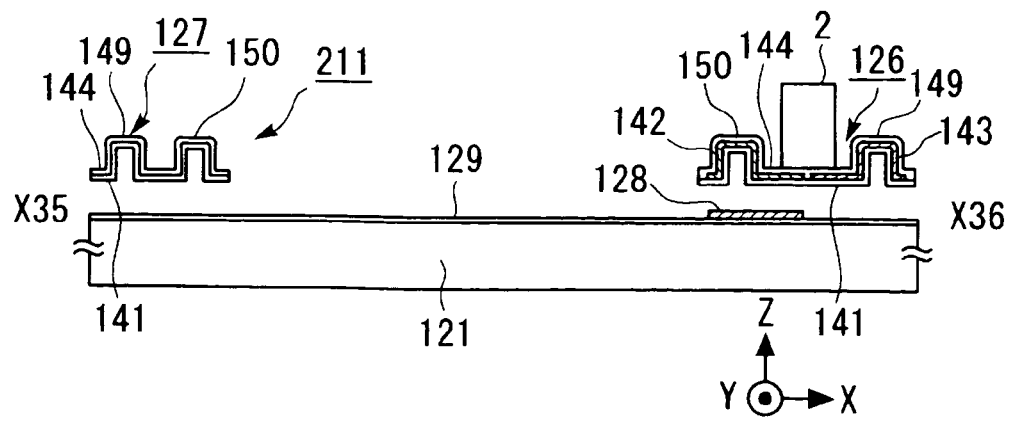
FIG. 27 is a schematic sectional view along line X35-X36 in FIG. 24.
Figure 28:
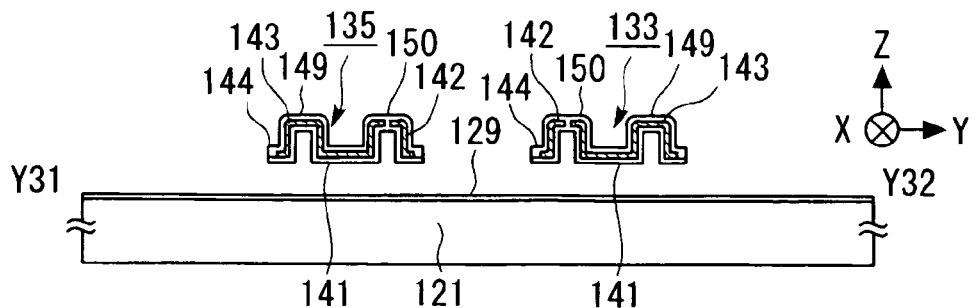
FIG. 28 is a schematic sectional view along line Y31-Y32 in FIG. 24.
Figure 29:
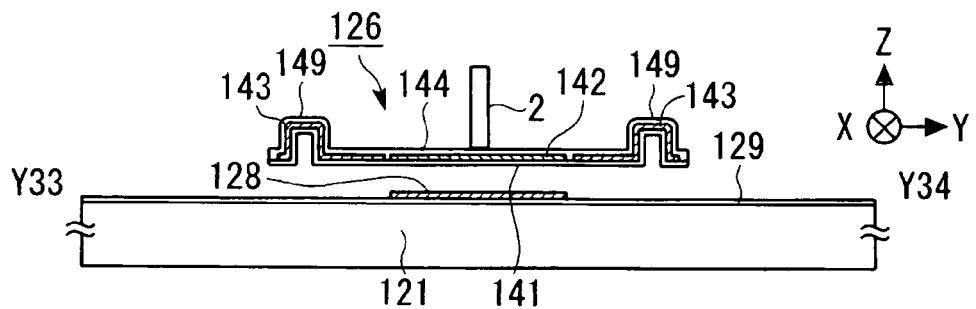
FIG. 29 is a schematic sectional view along line Y33-Y34 in FIG. 24.
Figure 30:
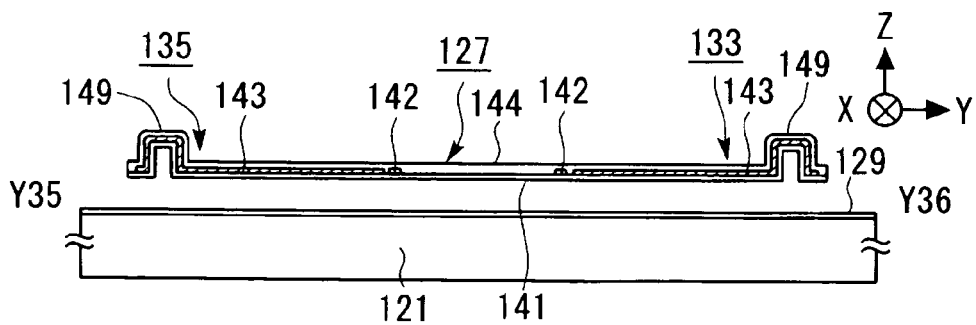
FIG. 30 is a schematic sectional view along line Y35-Y36 in FIG. 24.
Figure 31:
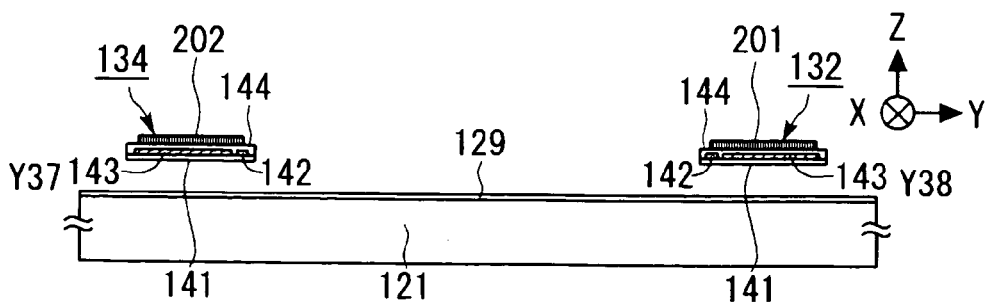
FIG. 31 is a schematic sectional view along line Y37-Y38 in FIG. 24.

FIG. 24 is a schematic plan view which shows in model form a microactuator 211 that constitutes a fifth working configuration of the present invention and a mirror 2 that is driven by this microactuator. In FIG. 24, the SiN film 144 that is formed over the entire surface of the movable part and leg part is omitted, and the lines of the protruding strip parts 149 and 150 that should naturally be drawn by solid lines are indicated by broken lines; furthermore, respectively different hatching is applied to the Al films 142 and 143 and the Al films 201 and 202 that are partially formed on the SiN film 144. FIG. 25 is a schematic sectional view along line X31-X32 in FIG. 24. Although this is not shown in the figures, a schematic sectional view along line X39-X40 in FIG. 24 is the same as FIG. 25. FIG. 26 is a schematic sectional view along line X33-X34 in FIG. 24. Although this is not shown in the figures, a schematic sectional view along line X37-X38 in FIG. 24 is the same as FIG. 26. FIG. 27 is a schematic sectional view along line X35-X36 in FIG. 24. FIG. 28 is a schematic sectional view along line Y31-Y32 in FIG. 24. FIG. 29 is a schematic sectional view along line Y33-Y34 in FIG. 24. FIG. 30 is a schematic sectional view along line Y35-Y36 in FIG. 24. FIG. 31 is a schematic sectional view along line Y37-Y38 in FIG. 24. Furthermore, in FIGS. 25 through 31, the bridge constituent parts 132 and 134 are shown as not being bent in the direction of the Z axis; in actuality, however, like the bridge constituent part 14 in FIG. 1, the bridge constituent parts 132 and 134 are bent in the +Z direction in a state in which the movable part receives no force.

FIGS. 24 through 31 respectively correspond to FIGS. 15 through 22 that show the fourth working configuration described above. In FIGS. 24 through 31, elements that are the same as elements in FIGS. 15 through 22, or that correspond to elements in FIGS. 15 through 22, are labeled with the same symbols, and a redundant description of such elements is omitted.

The microactuator 211 of the present working configuration differs from the microactuator 111 of the fourth working configuration only in the respects described below.

In the fourth working configuration described above, no film is formed on top of the SiN film 144 that is formed over the entire surface (uppermost surface) of the movable part and leg part. In the present working configuration, on the other hand, as is shown in FIGS. 24, 25 and 31, Al films 201 and 202 are further respectively formed on top of the SiN film 144 only in the regions of the bridge constituent parts 132 and 134.

Accordingly, the present working configuration differs from the fourth working configuration in that the bridge constituent part 132 is a thin film consisting of four layers (three layers in the gap between the Al films 142 and 143) in which the lower-side SiN film 141, intermediate Al films 142 and 143, upper-side SiN film 144 and further upper-side Al film 201 are laminated, and is constructed so as to act as a plate spring part. Similarly, the bridge constituent part 134 is a thin film consisting of four layers (three layers in the gap between the Al films 142 and 143) in which the lower-side SiN film 141, intermediate Al films 142 and 143, upper-side SiN film 144 and further upper-side Al film 202 are laminated, and is constructed so as to act as a plate spring part.

Meanwhile, in the present working configuration as in the fourth working configuration described above, the bridge constituent part 133 is also formed by a thin film consisting of three layers (two layers in the gap between the Al films 142 and 143) in which the lower-side SiN film 141, intermediate Al films 142 and 143 and SiN film 144 used as an upper-side protective film (these films extending continuously "as is" from the bridge constituent part 132) are laminated. Similarly, the bridge constituent part 135 is formed by a thin film consisting of three layers (two layers in the gap between the Al films 142 and 143) in which the lower-side SiN film 141, intermediate Al films 142 and 143 and SiN film 144 used as an upper-side protective film (these films extending continuously "as is" from the bridge constituent part 134) are laminated.

Thus, in the present working configuration, the SiN film 141, Al film 142 and SiN film 144 extend continuously "as is" to the bridge constituent part 132 and bridge constituent part 133, and an Al film 201 is formed on top of the SiN film 144 in the bridge constituent part 132. On the other hand, no Al film 201 is formed on top of the SiN film 144 in the bridge constituent part 133. Similarly, the SiN film 141, Al film 142 and SiN film 144 extend continuously "as is" to the bridge constituent part 134 and bridge constituent part 135, and an Al film 202 is formed on top of the SiN film 144 in the bridge constituent part 134. On the other hand, no Al film 202 is formed on top of the SiN film 144 in the bridge constituent part 135.

Accordingly, in the present working configuration, the number of layers in the bridge constituent part 133 is smaller than the number of layers in the bridge constituent part 132, and the number of layers, the materials of the respective layers and the layer thicknesses of the respective layers are the same between the layers forming all of the bridge constituent part 133 (i.e., the layers formed by the films 141 through 144) and the layers formed by parts of the bridge constituent part 132 (i.e., the layers formed by the films 141 through 144). In this respect, the bridge constituent parts 134 and 135 are the same as the bridge constituent parts 132 and 133.

In the fourth working configuration described above, both the bridge constituent part 132 and the bridge constituent part 133 have exactly the same layer structure; accordingly, the internal stress that is necessary in order to bend the bridge constituent parts 132 and 134 in the +Z direction in a state in which the movable part receives no force can be generated in the films 141 through 144 by setting the film thicknesses and film formation conditions. Consequently, the bridge constituent part 133 also inevitably has a relatively large internal stress that is generated by the films 141 through 144; however, the rigidity of the bridge constituent part 133 is ensured by forming the protruding strip parts 149 and 150. In this respect, the bridge constituent parts 134 and 135 are the same as the bridge constituent parts 132 and 133. Accordingly, the protruding strip parts 149 and 150 must resist the relatively large internal stress described above.

In the present working configuration, on the other hand, the film thicknesses and film formation conditions of the respective layers are set so that the stress that is generated by the films 141 through 144 is small. As a result, the internal stress of the bridge constituent parts 133 and 135 which are endowed with rigidity so as to maintain a flat-plate-form shape is reduced. For example, focusing on the three-layer structure of the films 141 through 144, the upper and lower layers (SiN films 141 and 144) of these three layers consist of the same material. Accordingly, if the film thicknesses of the SiN films 141 and 144 are set at the same value, the internal stress that is generated by the films 141 through 144 can be reduced as a result of this symmetry. On the other hand, the film thicknesses and film formation conditions of the films 201 and 202 are set so that the internal stress generated by the films 141 through 144 and 201 as a whole, and the internal stress generated by the films 141 through 144 and 202 as a whole, constitute an internal stress that is sufficient to bend the bridge constituent parts 132 and 134 respectively in the +Z direction in a state in which the movable part receives no force. Furthermore, the film thicknesses and film formation conditions of the films 201 and 202 can be made the same by forming these films at the same time.

Thus, in the present working configuration, the bridge constituent parts 132 and 134 are bent in the +Z direction in a state in which the movable part receives no force, and in spite of this, the internal stress of the bridge constituent parts 133 and 235 which are endowed with rigidity so as to maintain a flat-plate-form shape can be reduced. Accordingly, the load on the protruding strip parts 149 and 150 can be greatly reduced. Consequently, the rigidity of the bridge constituent parts 133 and 135 can be more securely ensured, so that the bridge constituent parts 133 and 135 can be more securely maintained in a flat-plate-form shape.

In addition to such advantages, it goes without saying that advantages similar to those of the fourth working configuration are also obtained in the present working configuration.

(Sixth Working Configuration)

Figure 32:
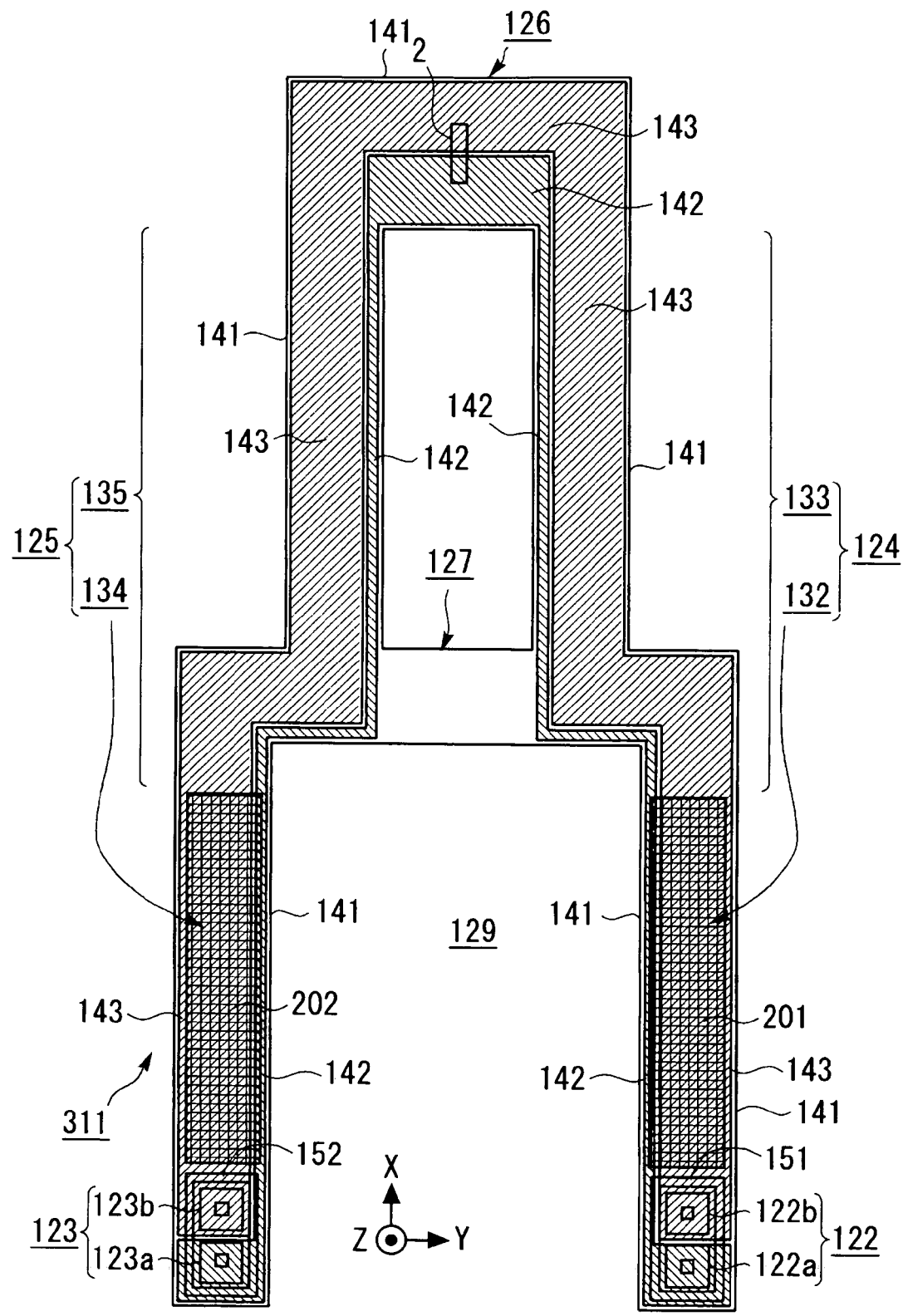
FIG. 32 is a schematic plan view which shows in model form a microactuator constituting a sixth working configuration of the present invention and a mirror that is driven by this microactuator.

FIG. 32 is a schematic plan view which shows in model form a microactuator 311 that constitutes a sixth working configuration of the present invention and a mirror 2 that is driven by this microactuator. In FIG. 32, the SiN film 144 that is formed over the entire surface of the movable part and leg part is omitted, and the lines of the protruding strip parts 149 and 150 that should naturally be drawn by solid lines are indicated by broken lines. Furthermore, respectively different hatching is applied to the Al films 142 and 143 and the Al films 201 and 202 that are partially formed on the SiN film 144.

FIG. 32 corresponds to FIG. 24 which shows the fifth working configuration described above. In FIG. 32, elements that are the same as elements in FIG. 24, or that correspond to elements in FIG. 24, are labeled with the same symbols, and a redundant description of such elements is omitted.

The microactuator 311 of the present working configuration differs from the microactuator 211 of the fifth working configuration only in that the protruding strip parts 149 and 150 formed in the fifth working configuration are not formed in the present working configuration.

As is seen from the description of the fifth working configuration described above, the bridge constituent parts 132 and 134 in this fifth working configuration are bent in the +Z direction in a state in which the movable part receives no force, and in spite of this, the internal stress of the bridge constituent parts 133 and 135 can be reduced. Accordingly, even if the protruding strip parts 149 and 150 are not formed (as in the present working configuration), the bridge constituent parts 132 and 134 can be bent in the +Z direction, and the bridge constituent parts 133 and 135 can be maintained in a flat-plate-form shape, in a state in which the movable part receives no force. Of course, in the present working configuration, since the protruding strip parts 149 and 150 are not formed, the bridge constituent parts 133 and 135 act as plate spring parts, and flex accordingly when the movable part receives a force. However, in a state in which the movable part receives no force, the bridge constituent parts 132 and 134 and the bridge constituent parts 133 and 135 have different bent or non-bent states as described above; accordingly, advantages that are substantially the same as those of the fourth working configuration described above can also be obtained in the present working configuration.

(Seventh Working Configuration)

Figure 33:
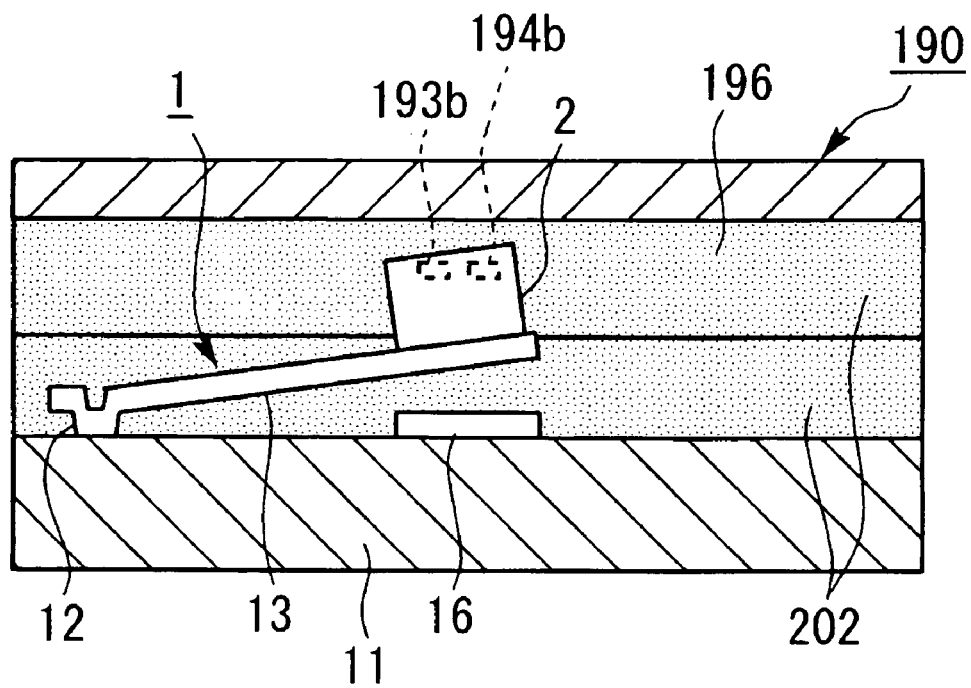
FIG. 33 is a schematic sectional view which shows in model form an optical switch constituting a seventh working configuration of the present invention, in a state in which no driving signal is supplied to this optical switch.
Figure 34:
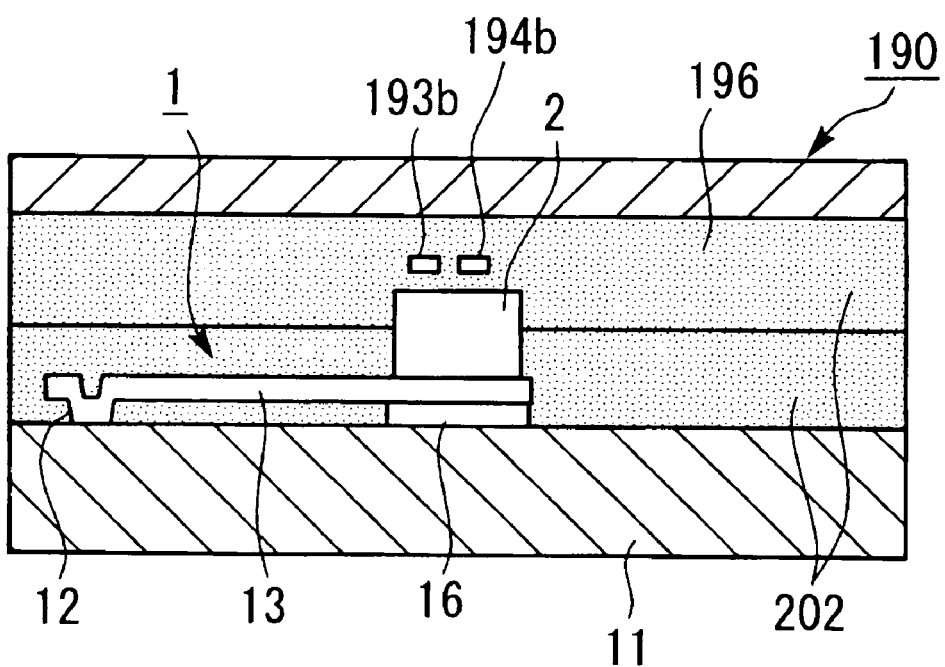
FIG. 34 is a schematic sectional view which shows in model form an optical switch constituting a seventh working configuration of the present invention, in a state in which a driving signal is supplied to this optical switch.

FIGS. 33 and 34 are schematic sectional views which respectively show in model form an optical switch constituting a seventh working configuration of the present invention. FIG. 33 shows a state in which no driving signal is supplied, and FIG. 34 shows a state in which a driving signal is supplied. Furthermore, in FIGS. 33 and 34, the structure of the microactuator 1 is shown in a greatly simplified form.

Figure 35:
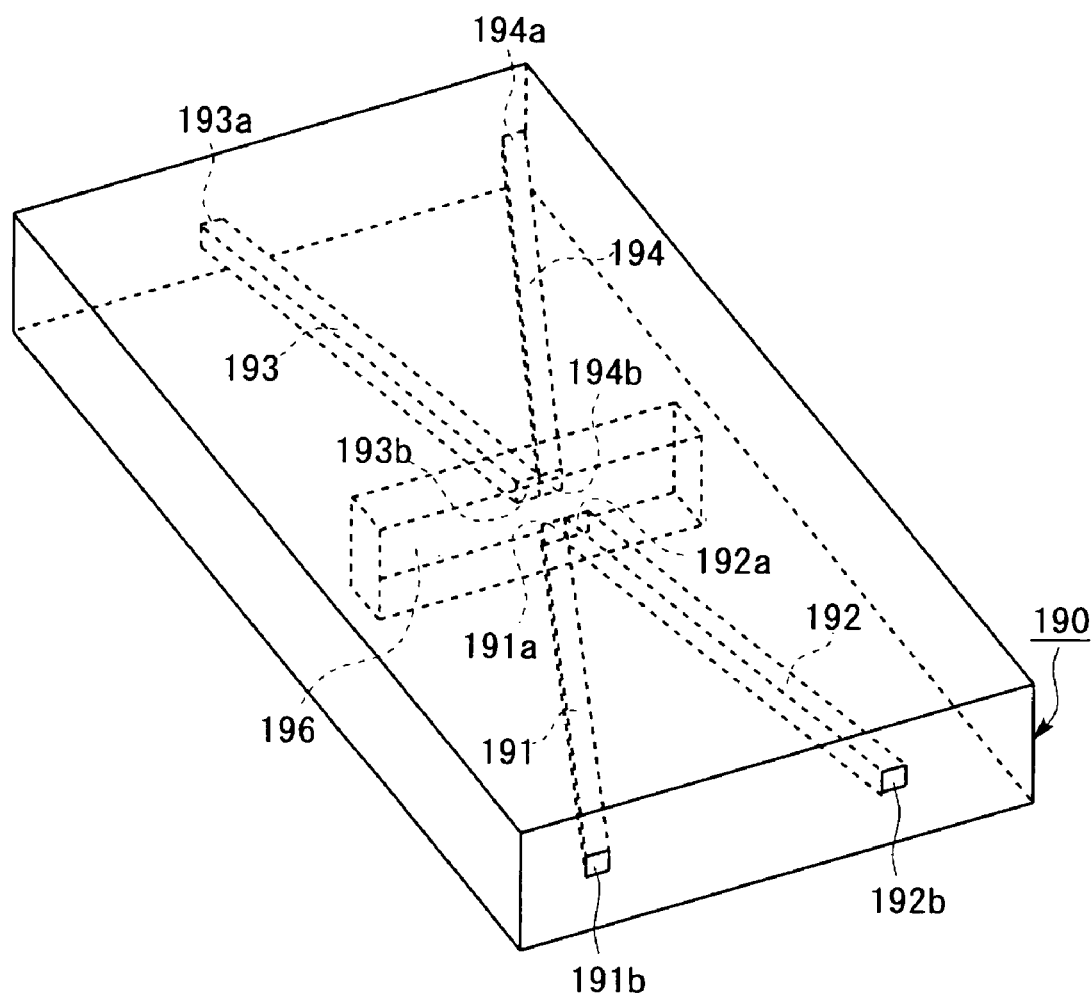
FIG. 35 is a schematic perspective view which shows in model form the optical waveguide substrate in FIGS. 33 and 34.

FIG. 35 is a schematic perspective view which shows in model form the optical waveguide substrate 190 shown in FIGS. 33 and 34.

The optical switch of the present working configuration comprises the microactuator 1 of the first working configuration shown in FIGS. 1 through 3, a mirror 2 that is mounted on this microactuator, and an optical waveguide substrate 190.

In the present working configuration, as is shown in FIG. 35, the optical waveguide substrate 190 has four optical waveguides 191 through 194 that propagate the light that is to be switched. For example, the optical waveguide substrate 190 has a groove 196 with a width of several tens of microns in the central part, and the end surfaces 191a, 192a, 193b and 194b of the optical waveguides 191 through 194 are exposed in the side surfaces of this groove 196. As is shown in FIGS. 33 and 34, the gap between the end surface 191a and end surface 192a, and the gap between the end surface 193b and end surface 194b, are designed as gaps that can be covered by the reflective surface of the mirror 2.

As is shown in FIGS. 33 and 34, the optical waveguide substrate 190 is disposed on the surface of the substrate 11 of the microactuator 1, and a refractive index adjusting liquid 202 is sealed inside the space between the optical waveguide substrate 190 and the substrate 11, and inside the space of the groove 196 that communicates with this first space. Of course, it is not absolutely necessary to seal a refractive index adjusting liquid 202 inside these spaces. Furthermore, the substrate 11 and optical waveguide substrate 190 are positioned so that the mirror 2 can be inserted into the groove 196.

As is shown in FIG. 34, in a state in which a voltage is applied across the fixed electrode 16 and the movable electrode (not shown in FIGS. 33 and 34) of the microactuator 1, the mirror 2 is positioned lower than the end surfaces 193b and 194b of the optical waveguides 193 and 194. Accordingly, for example, in a case where light is incident from the end surface 193a of the optical waveguide 193, the light that is propagated through the optical waveguide 193 is emitted from the end surface 193b, and is incident "as is" on the end surface 192a of the facing optical waveguide 192; this light is propagated through the optical waveguide 192, and is emitted from the end surface 192b. Furthermore, for example, in a case where light is incident from the end surface 191b of the optical waveguide 191, the light that is propagated through the optical waveguide 191 is emitted from the end surface 191a, and is incident "as is" on the end surface 194b of the facing optical waveguide 194; this light is propagated through the optical waveguide 194, and is emitted from the end surface 194a.

On the other hand, in a state in which no voltage is applied across the fixed electrode 16 and movable electrode of the microactuator 1, the mirror 2 is positioned so as to cover the end surfaces 193b and 194b of the optical waveguides 193 and 194 as shown in FIG. 33. Accordingly, for example, in a case where light is incident from the end surface 193a of the optical waveguide 193, the light that is propagated through the optical waveguide 193 is emitted from the end surface 193b, and is reflected by the mirror 2, so that this light is incident on the end surface 194b of the optical waveguide 194. This light is then propagated through the optical waveguide 194, and is emitted from the end surface 194a. Furthermore, for example, in a case where light is incident from the end surface 191b of the optical waveguide 191, the light that is propagated through the optical waveguide 191 is emitted from the end surface 191a, and is reflected by the mirror 2, so that this light is incident on the end surface 192a of the optical waveguide 192. This light is then propagated through the optical waveguide 192, and is emitted from the end surface 192b.

In this working configuration, since the microactuator 1 of the first working configuration is used, the microactuator 1 can be operated at a low power.

In this working configuration, the microactuator 1 may also be replaced by any of the microactuators 41, 91, 111, 211 and 311 of the second through sixth working configurations described above. Furthermore, for example, in cases where these microactuators 41, 91, 111, 211 and 311 are used, a permanent magnet that is used to generate the magnetic field described above may be disposed on the optical waveguide substrate 190.

The present working configuration shows an example of a case in which there is a single intersection point of optical waveguides in the optical waveguide substrate 190, so that there is accordingly a single mirror 2 and a single microactuator 1. However, for example, a construction may also be used in which optical waveguides are formed in a two-dimensional matrix in the optical waveguide substrate 190 so that the intersection points of the optical waveguides are disposed in a two-dimensional matrix, a plurality of microactuators are accordingly disposed in two dimensions on the surface of the substrate 11, and the mirrors 2 positioned at the respective intersection points of the optical waveguides are driven by individual microactuators.

Respective working configurations and modifications of the present invention have been described above. However, the present invention is not limited to these working configurations and modifications. For example, the microactuator of the present invention can also be used in various applications other than optical switches.

INDUSTRIAL APPLICABILITY

The microactuator of the present invention can be used in optical switches, etc., and the optical switch of the present invention can be used in (for example) optical communication devices and optical transfer devices, etc.

The invention claimed is:

1. A microactuator comprising:
a fixed part; and
a movable part;
wherein the movable part has a cantilever structure and comprises a fixed end fastened to the fixed part, a free end opposite to the fixed end, and a bridge part between the fixed end and free end;
wherein the bridge part comprises a plurality of bridge constituent parts that are connected in series between the fixed end and the free end, and at least one of the bridge constituent parts is bent differently, along a movement direction of the movable part, with respect to the fixed part than another of the bridge constituent parts when the movable part does not receive any force; and
wherein the plurality of bridge constituent parts comprises:
a first bridge constituent part that is closest to the fixed end of the movable part among the plurality of bridge constituent parts and which is a plate spring;
a second bridge constituent part which is substantially rigid at least against flexing toward and away from the fixed part, and which comprises a planar part and a reinforcing part that one of rises and drops from the planar part, said planar part and said reinforcing part being made from a same at least one material.

2. The microactuator according to claim 1, wherein the first bridge constituent part is bent away from the fixed part when the movable part does not receive any force; and the second bridge constituent part is not substantially bent with respect to the fixed part.

3. The microactuator according to claim 1, wherein the fixed end of the movable part is fastened to the fixed part via a leg part that comprises a rising part that rises from the fixed part.

4. The microactuator according to claim 1, wherein the movable part is constructed from a thin film.

5. The microactuator according to claim 1, wherein the fixed part comprises a first electrode part, the movable part comprises a second electrode part, and an electrostatic force is generated between the first and second electrode parts as a result of an application of a voltage across the first electrode part and second electrode part.

6. A microactuator comprising:

a fixed part; and a movable part;

wherein the movable part has a cantilever structure and comprises a fixed end fastened to the fixed part, a free end opposite to the fixed end, and a bridge part between the fixed end and free end;

wherein the bridge part comprises a plurality of bridge constituent parts that are connected in series between the fixed end and the free end, and at least one of the bridge constituent parts is bent differently, along a movement direction of the movable part, with respect to the fixed part than another of the bridge constituent parts when the movable part does not receive any force; and wherein the fixed end of the movable part is fastened to the fixed part via a leg part that comprises a rising part that rises from the fixed part, and the leg part is constructed from a thin film.

7. The microactuator according to claim 6, wherein the plurality of bridge constituent parts comprises:

a first bridge constituent part that is closest to the fixed end of the movable part among the plurality of bridge constituent parts and which is a plate spring;

a second bridge constituent part which is substantially rigid at least against flexing toward and away from the fixed part.

8. The microactuator according to claim 7, wherein the first bridge constituent part is bent away from the fixed part when the movable part does not receive any force; and the second bridge constituent part is not substantially bent with respect to the fixed part.

9. The microactuator according to claim 7, wherein the second bridge constituent part comprises a planar part and a reinforcing part that one of rises and drops from the planar part.

10. The microactuator according to claim 6, wherein the movable part is constructed from a thin film.

11. The microactuator according to claim 6, wherein the fixed part comprises a first electrode part, the movable part comprises a second electrode part, and an electrostatic force is generated between the first and second electrode parts as a result of an application of a voltage across the first electrode part and second electrode part.

* * * * *